(12) United States Patent
Gaufin et al.

(10) Patent No.: US 11,731,471 B2
(45) Date of Patent: Aug. 22, 2023

(54) METHODS AND SYSTEMS FOR MONITORING COUPLING OF FIFTH WHEELS TO KINGPINS

(71) Applicant: Fontaine Fifth Wheel Company, Jasper, AL (US)

(72) Inventors: Carl Gaufin, Madison, AL (US); Ryan Fechner, Madison, AL (US)

(73) Assignee: Fontaine Fifth Wheel Company, Jasper, AL (US)

( * ) Notice: Subject to any disclaimer, the term of this patent is extended or adjusted under 35 U.S.C. 154(b) by 966 days.

(21) Appl. No.: 16/394,683

(22) Filed: Apr. 25, 2019

(65) Prior Publication Data

US 2019/0329612 A1 Oct. 31, 2019

Related U.S. Application Data

(60) Provisional application No. 62/663,362, filed on Apr. 27, 2018.

(51) Int. Cl.
*B60D 1/28* (2006.01)
*B60D 1/01* (2006.01)
(Continued)

(52) U.S. Cl.
CPC ............... *B60D 1/28* (2013.01); *B60D 1/015* (2013.01); *B62D 53/10* (2013.01); *B62D 53/12* (2013.01);
(Continued)

(58) Field of Classification Search
CPC . B60D 1/015; B60D 1/28; B60D 1/36; B60D 1/62; B62D 53/08; B62D 53/10; B62D 53/12; F16D 5/00; F16D 2500/7102
See application file for complete search history.

(56) References Cited

U.S. PATENT DOCUMENTS

| 2,977,137 A | 3/1961 | Durham |
| 4,477,100 A * | 10/1984 | Elyakim ............... B62D 53/12 280/434 |

(Continued)

FOREIGN PATENT DOCUMENTS

| CA | 2340575 A1 | 10/2001 |
| CA | 2341799 A | 10/2021 |

(Continued)

OTHER PUBLICATIONS

International Search Report and Written Opinion issued in corresponding International Application No. PCT/US2019/029288, dated Jul. 3, 2019.

(Continued)

*Primary Examiner* — Kevin Hurley
*Assistant Examiner* — Maurice L Williams
(74) *Attorney, Agent, or Firm* — Andrus Intellectual Property Law, LLP

(57) ABSTRACT

A fifth wheel system includes a fifth wheel configured to couple to a kingpin of a towed trailer such that vibrations are generated when the fifth wheel couples to the kingpin. A sensor in operative association with the fifth wheel and configured to sense the vibrations and generates vibration data. A controller receives the vibration data and processes the vibration data to detect a presence or an absence of a predetermined vibration component that occurs when the fifth wheel properly couples to the kingpin. An indicator indicates proper coupling of the fifth wheel to the kingpin when the predetermined vibration component is present.

21 Claims, 14 Drawing Sheets

(51) Int. Cl.
  *B62D 53/10* (2006.01)
  *B62D 53/12* (2006.01)
  *F16D 5/00* (2006.01)
(52) U.S. Cl.
  CPC ........ *F16D 5/00* (2013.01); *F16D 2500/7102* (2013.01)

(56) References Cited

U.S. PATENT DOCUMENTS

| | | | |
|---|---|---|---|
| 4,804,234 A | 2/1989 | Gee et al. | |
| 4,946,183 A | 8/1990 | Benson et al. | |
| 5,152,544 A | 10/1992 | Dierker, Jr. et al. | |
| 5,193,063 A | 3/1993 | Assh | |
| 5,477,207 A | 12/1995 | Frame, Sr. et al. | |
| 5,516,137 A | 5/1996 | Kass et al. | |
| 5,516,138 A | 5/1996 | Fontaine | |
| 5,641,174 A | 6/1997 | Terry et al. | |
| 5,861,802 A | 1/1999 | Hungerink et al. | |
| 5,876,055 A | 3/1999 | Fontaine | |
| 5,988,665 A | 11/1999 | Terry et al. | |
| 5,988,666 A | 11/1999 | Flater | |
| 6,095,544 A | 8/2000 | Flater | |
| 6,100,794 A | 8/2000 | Hillier | |
| 6,130,487 A * | 10/2000 | Bertalan | B60D 1/62 307/9.1 |
| 6,285,278 B1 | 9/2001 | Schutt et al. | |
| 6,452,485 B1 | 9/2002 | Schutt et al. | |
| 6,587,041 B1 | 7/2003 | Brown, Jr. | |
| 6,739,611 B2 * | 5/2004 | Gisinger | B62D 53/08 280/432 |
| 6,866,283 B2 | 3/2005 | Alguera et al. | |
| 7,140,632 B2 | 11/2006 | Alguera et al. | |
| 7,240,913 B2 | 7/2007 | Kahrs et al. | |
| 7,384,056 B2 | 6/2008 | Anderson | |
| 7,537,235 B2 | 5/2009 | Flater et al. | |
| 7,548,155 B2 | 6/2009 | Schutt et al. | |
| 7,555,370 B2 | 6/2009 | Breed et al. | |
| 7,556,278 B2 | 7/2009 | Roberts et al. | |
| 7,735,849 B1 | 6/2010 | Mann | |
| 7,825,783 B2 | 11/2010 | Gallego et al. | |
| 7,889,096 B2 | 2/2011 | Breed | |
| 7,932,816 B2 | 4/2011 | Schmidt et al. | |
| 8,024,084 B2 | 9/2011 | Breed | |
| 8,036,788 B2 | 10/2011 | Breed | |
| 8,210,558 B2 | 7/2012 | Mann et al. | |
| 8,229,624 B2 | 7/2012 | Breed | |
| 9,102,371 B2 | 8/2015 | Keatley | |
| 9,302,557 B2 | 4/2016 | Alldredge et al. | |
| 9,327,782 B2 | 5/2016 | Alldredge et al. | |
| 9,723,692 B2 | 8/2017 | Sibley, Jr. et al. | |
| 9,738,333 B2 | 8/2017 | Alldredge et al. | |
| 9,862,242 B2 | 1/2018 | Lurie | |
| 10,351,061 B1 * | 7/2019 | Chaudhari | B60D 1/36 |
| 10,654,772 B2 | 5/2020 | Vajda et al. | |
| 10,926,816 B2 | 2/2021 | Schutt et al. | |
| 11,364,885 B2 | 6/2022 | Viele | |
| 2004/0017285 A1 | 1/2004 | Zielinski et al. | |
| 2004/0075241 A1 | 4/2004 | Alguera et al. | |
| 2004/0148078 A1 | 7/2004 | Nakano et al. | |
| 2006/0186636 A1 | 8/2006 | Schutt | |
| 2008/0191937 A1 | 8/2008 | Wisherd et al. | |
| 2008/0303647 A1 | 12/2008 | Pare | |
| 2011/0010065 A1 | 1/2011 | Bach et al. | |
| 2015/0203128 A1 * | 7/2015 | Strano | B60R 1/003 340/431 |
| 2016/0075197 A1 * | 3/2016 | Coleman | B62D 53/0864 280/433 |
| 2017/0015163 A1 | 1/2017 | Sielhorst | |
| 2017/0174019 A1 * | 6/2017 | Lurie | B60D 1/62 |
| 2017/0174275 A1 | 6/2017 | Mohamad Jembari et al. | |
| 2017/0305436 A1 | 10/2017 | Maskell et al. | |
| 2017/0368897 A1 | 12/2017 | Brickley et al. | |
| 2019/0071123 A1 * | 3/2019 | Zhang | B60D 1/62 |
| 2019/0367107 A1 * | 12/2019 | Grossman | G05D 1/0225 |
| 2020/0102993 A1 | 4/2020 | Antanaitis | |
| 2020/0114711 A1 * | 4/2020 | Nixon | B60D 1/36 |
| 2020/0262256 A1 | 8/2020 | Gaufin et al. | |
| 2020/0331441 A1 * | 10/2020 | Sielhorst | B62D 15/023 |
| 2020/0398749 A1 | 12/2020 | Mains, Jr. | |
| 2022/0185397 A1 | 6/2022 | Soder et al. | |
| 2022/0291687 A1 | 9/2022 | Havens et al. | |
| 2022/0358677 A1 | 11/2022 | Critchley et al. | |

FOREIGN PATENT DOCUMENTS

| | | | | |
|---|---|---|---|---|
| CN | 105874339 A | * | 8/2016 | ......... H03K 17/9542 |
| CN | 105983803 A | * | 10/2016 | |
| CN | 206847543 U | * | 5/2018 | |
| DE | 4021717 A1 | | 1/1992 | |
| DE | 19820139 A1 | | 11/1999 | |
| DE | 19964045 A1 | | 7/2001 | |
| DE | 10065100 A1 | | 7/2002 | |
| DE | 19820139 | | 5/2008 | |
| EP | 0406036 A1 | | 1/1991 | |
| EP | 0471286 A1 | | 2/1992 | |
| EP | 0509137 A1 | | 10/1992 | |
| EP | 0794110 B1 | | 9/1997 | |
| EP | 1147973 A1 | | 10/2001 | |
| EP | 3954554 A1 | | 2/2022 | |
| GB | 2331735 A | | 6/1999 | |
| GB | 2543656 A | | 4/2017 | |
| WO | 1996020864 A1 | | 7/1996 | |
| WO | 2017144084 | | 8/2017 | |
| WO | 2021087451 A1 | | 5/2021 | |

OTHER PUBLICATIONS

International Preliminary Report on Patentability issued in corresponding International Application No. PCT/US2019/029288, dated Nov. 5, 2020.
Extended European Search Report for Corresponding EP Patent Application No. 19793336.9, dated Jan. 5, 2022.
Fifth Wheel Catalog, p. 5 item No. 10, https://www.jostinternational.com/wp-content/uploads/2016/06/5th-Wheel-Catalog.pdf, retrieved on Feb. 5, 2019.
Jost Product Bulletin, https://www.jostinternational.com/wp-content/uploads/2016/02/LT-JSK37-47-Product-Bulletin-Retractable-Handle-Update.pdf, retrieved on Feb. 5, 2019.
https://www.jostinformationcentre.com/static/upload/pdf/truck/Sensor_JSK_MUB007001M01_REV-A_05-2018_en.pdf, Jost World, Sensor JSK, Installation and operating instructions, p. 7, May 2018.
https://www.jostinformationcentre.com/static/upload/pdf/truck/SKS_MUB_199007119_1006240_01 -2016_EN.pdf, Jost World, Sensor JSK, Installation and operating instructions, p. 36 and 49, Jan. 2016.
https://www.youtube.com/watch?v=xM_vMXThvHQ, Jost World, Jost KKS System, Aug. 16, 2010.
https://www.youtube.com/watch?v=9pMINQk9JYw, Jost World | JOST Sensor-Kupplungs-System SKS / Sensor-Coupling-System, Mar. 16, 2010.
https://www.jostinternational.com/37usk/, Jost International, JSK37USK Sensor Fifth Wheel, 2020.
Vortex, Definition & Meaning, Merriam-Webster, https://www.merriam-webster.com/dictionary/vortex, 7 pages.
CN105983803A, Machine Translation, https://worldwide.espacenet.com/publicationDetails/description?CC=CN&NR=105983803A&KC=A&FT=D&ND=3&date=20161005&DB=&locale=en_EP, 5 pages.

* cited by examiner

METHODS AND SYSTEMS FOR MONITORING COUPLING OF FIFTH WHEELS TO KINGPINS

CROSS-REFERENCE TO RELATED APPLICATION

The present disclosure is based on and claims priority to U.S. Provisional Application No. 62/663,362, filed Apr. 27, 2018, the disclosure of which is incorporated by reference.

FIELD

The present disclosure relates to fifth wheels, and more particularly to methods and systems for monitoring coupling of fifth wheels to kingpins of trailers.

BACKGROUND

The following U.S. Patents are incorporated herein by reference in entirety.

U.S. Pat. No. 5,516,138 discloses a mechanism for locking and unlocking of a kingpin of a fifth wheel. The mechanism includes a jaw member, a wedge member, a bumper member, and a lever member interconnecting the jaw member, the wedge member, and the bumper member. A handle member includes a handle extension member U.S. Pat. No. 5,641,174 discloses an interconnection of a jaw, a wedge, and operating handle in a fifth wheel that ensures security of a fifth wheel system. The jaw is connected to the operating handle by a pivoting timing lever which pivots off a pin on the jaw such that the jaw remains engaged with the fifth wheel until the wedge is substantially removed from engagement with the jaw. In cooperation with the primary locking mechanism, a secondary lock is provided at the end of the operating handle such that a pawl arrangement engages a stop on the fifth wheel assembly until positively released by the operator.

U.S. Pat. No. 7,735,849 discloses a fifth wheel hitch and a locking mechanism for retaining a trailer kingpin within a fifth wheel slot. The locking mechanism includes a jaw assembly comprised of two opposing jaw members pivotally attached at one end to the underside of the hitch plate and a longitudinally sliding cam interposed between the jaw members with a tip that contacts a bumper. The bumper is pivotally attached to tie bar that has its rearmost end pivotally attached to the underside of the hitch plate.

U.S. Pat. No. 8,210,558 discloses a secondary lock assembly for a fifth wheel having a hitch plate with a rearward opening slot to receive a trailer kingpin and a transversely sliding primary locking member for retaining the kingpin within the slot. The assembly includes a tie bar pivotally connected at its middle to the primary locking member and a transversely oriented pull bar pivotally connected at an inner end to the forward end of the tie bar.

U.S. Pat. No. 9,302,557 includes a fifth wheel having a top plate with a throat that is adapted to receive a kingpin of a trailer. The fifth wheel is equipped with a locking mechanism including a jaw slidably connected to the top plate and slidable between a closed position where the jaw blocks passage of a kingpin out of the throat of the fifth wheel and an open position where a kingpin may pass into and out of the throat of the fifth wheel. The jaw has an edge adapted to engage a kingpin positioned in the throat of the fifth wheel when the jaw is in the closed position. A release arm is pivotally attached to the top plate and the jaw.

U.S. Pat. No. 9,327,782 discloses a fifth wheel having a top plate with a throat that is adapted to receive a kingpin of a trailer. The fifth wheel is equipped with a locking mechanism including a jaw slidably connected to the top plate and slidable between a closed position where the jaw blocks passage of a kingpin out of the throat of the fifth wheel and an open position where a kingpin may pass into and out of the throat of the fifth wheel. The jaw has an edge adapted to engage a kingpin positioned in the throat of the fifth wheel when the jaw is in the closed position. A bias device urges the jaw towards the closed position.

U.S. Pat. No. 9,738,333 discloses a fifth wheel having a top plate with a throat that is adapted to receive a kingpin of a trailer. A pair of locking jaws are pivotally connected to the top plate and pivotal between a closed configuration where the pair of locking jaws block passage of a kingpin out of the throat and the locking jaws are held primarily in compression and an open configuration where a kingpin may pass into and out of the throat. Each of the pair of locking jaws has an engagement surface adapted to engage a kingpin positioned in the throat when the pair of locking jaws are in the closed configuration. A locking member is movably attached to the top plate and a mechanism urges the locking member into engagement with the pair of locking jaws when the pair of locking jaws are in the closed configuration.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In certain examples, a fifth wheel system includes a fifth wheel configured to couple to a kingpin of a towed trailer such that vibrations are generated when the fifth wheel couples to the kingpin. A sensor in operative association with the fifth wheel and configured to sense the vibrations and generate vibration data. A controller receives the vibration data and processes the vibration data to detect a presence or an absence of a predetermined vibration component that occurs when the fifth wheel properly couples to the kingpin. An indicator indicates proper coupling of the fifth wheel to the kingpin when the predetermined vibration component is present.

In certain examples, a method for monitoring coupling of a fifth wheel to a kingpin of a towed trailer includes sensing vibrations generated when the kingpin couples to the fifth wheel, generating vibration data based on the vibrations, and processing the vibration data to detect a presence or an absence of a predetermined vibration component that corresponds to proper coupling of the fifth wheel to the kingpin. The method can further include the steps of indicating proper coupling of the fifth wheel to the kingpin when the predetermined vibration component is present and indicating improper coupling of the fifth wheel to the kingpin when the predetermined vibration component is absent.

BRIEF DESCRIPTION OF THE DRAWINGS

The present disclosure includes the following Figures. The same numbers are used throughout the Figures to reference like features and like components.

DETAILED DESCRIPTION

Figure 1:
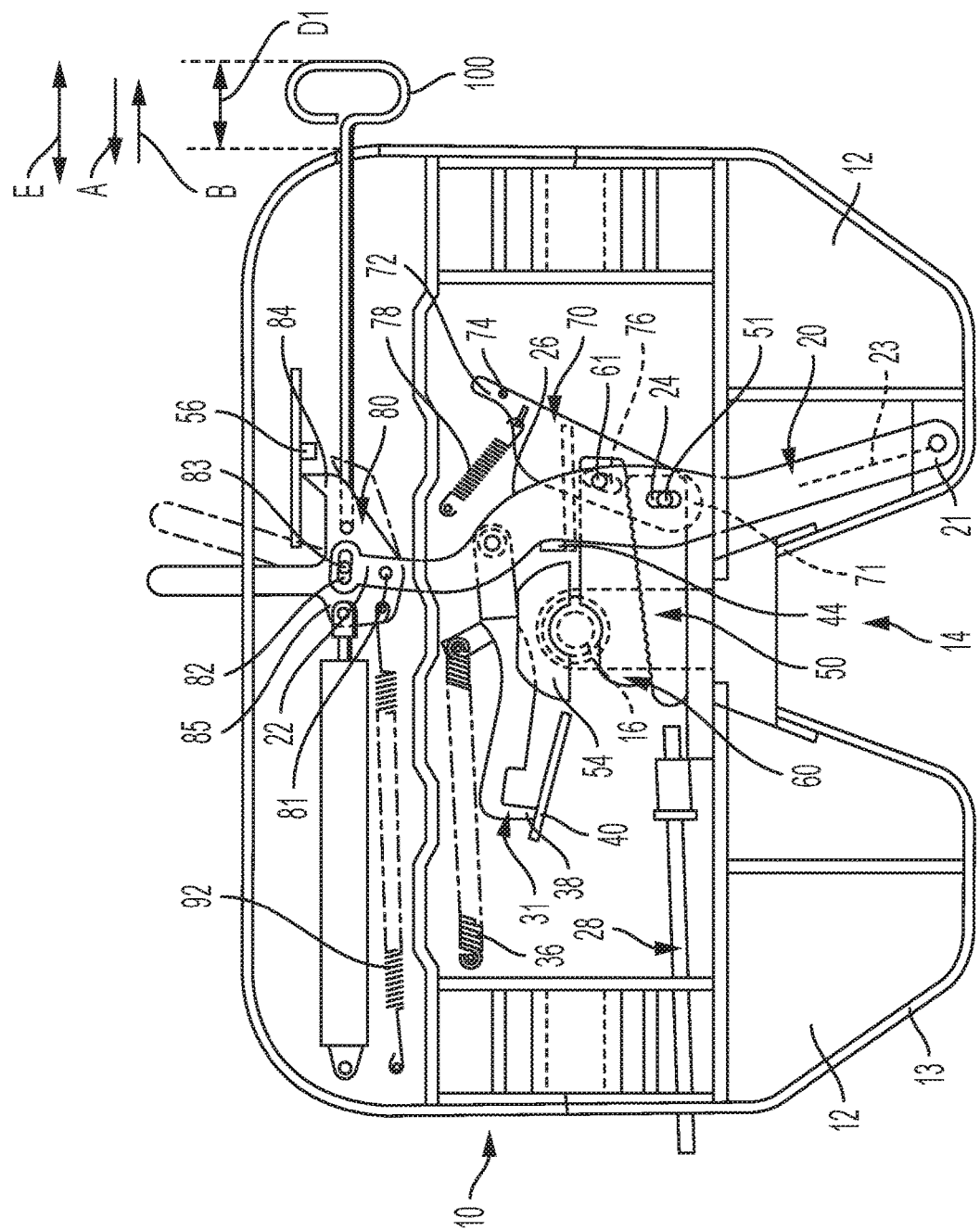
FIG. 1 is an underside view of an example fifth wheel in a locked position.

It is known to connect a towed trailer to a towing vehicle via a connection assembly commonly referred to as a fifth wheel. Specifically, the fifth wheel is a locking assembly on the towing vehicle that engages a kingpin of the towed trailer to thereby couple the towing vehicle to the towed trailer. Fifth wheels are constructed to avoid/prevent inadvertent disengagement of the kingpin from the fifth wheel.

Conventional fifth wheels have a pull handle that allows an operator to move the fifth wheel from a locked position in which the kingpin is locked in the fifth wheel and an unlocked position in which the kingpin can be inserted into or removed from the fifth wheel. As the kingpin is received into the fifth wheel, the kingpin contacts a trigger arm which causes an operating arm to pivot. As the operating arm pivots, a jaw member is moved into contact with the kingpin and the jaw member forces the kingpin into contact with a fixed jaw on the fifth wheel. As such the kingpin is clamped between the jaw member and the fixed jaw and the fifth wheel is coupled to the kingpin (e.g. the fifth wheel is locked onto the fifth wheel). Reference is made to the above-incorporated patents for further details and components of conventional fifth wheels and operation thereof.

Depending on the condition of the fifth wheel (e.g. components of the fifth wheel are excessively or mildly worn), the condition of the kingpin, and/or the speed at which the kingpin is received into the fifth wheel (e.g., the kingpin is received slowly into the throat of the fifth wheel) the fifth wheel may properly or improperly couple to the kingpin. Proper coupling of the fifth wheel to the kingpin occurs when the fifth wheel completely moves into the locked position such that the kingpin is securely locked and clamped between the jaw member and the fixed jaw. In this condition, there is a low risk that the kingpin will decouple from the fifth wheel. As such, the towed trailer can be safely moved by the towing vehicle.

However, improper coupling of the fifth wheel to the kingpin occurs when the fifth wheel is not completely moved into the locked position. This condition may be caused by failure of a component of the fifth wheel, excessive wear of one or more components of the fifth wheel, and/or the kingpin being incompletely received into the fifth wheel (e.g., the kingpin is jammed or stuck in the throat). As such, the kingpin is not fully secured in the fifth wheel. Improper coupling may cause the kingpin to inadvertently move in the fifth wheel as the vehicles are moved thereby damaging the fifth wheel and/or cause the kingpin to inadvertently decouple from the fifth wheel as the vehicles are moved.

The present inventors have recognized that proper coupling of the fifth wheel to the kingpin is necessary and important for the safe operation of the vehicles. Accordingly, the present inventors have endeavored to develop methods and systems that monitor coupling of the fifth wheel to the kingpin and clearly indicate to the operator whether proper or improper coupling has occurred. Accordingly, through research and experimentation, the present inventors have developed the monitoring and indicating systems of the present disclosure, which monitor and indicate the coupling status (e.g. proper coupling, improper coupling) of the fifth wheel to the kingpin. Furthermore, the present inventors have developed systems that can be easily added to existing fifth wheels.

Figure 2:
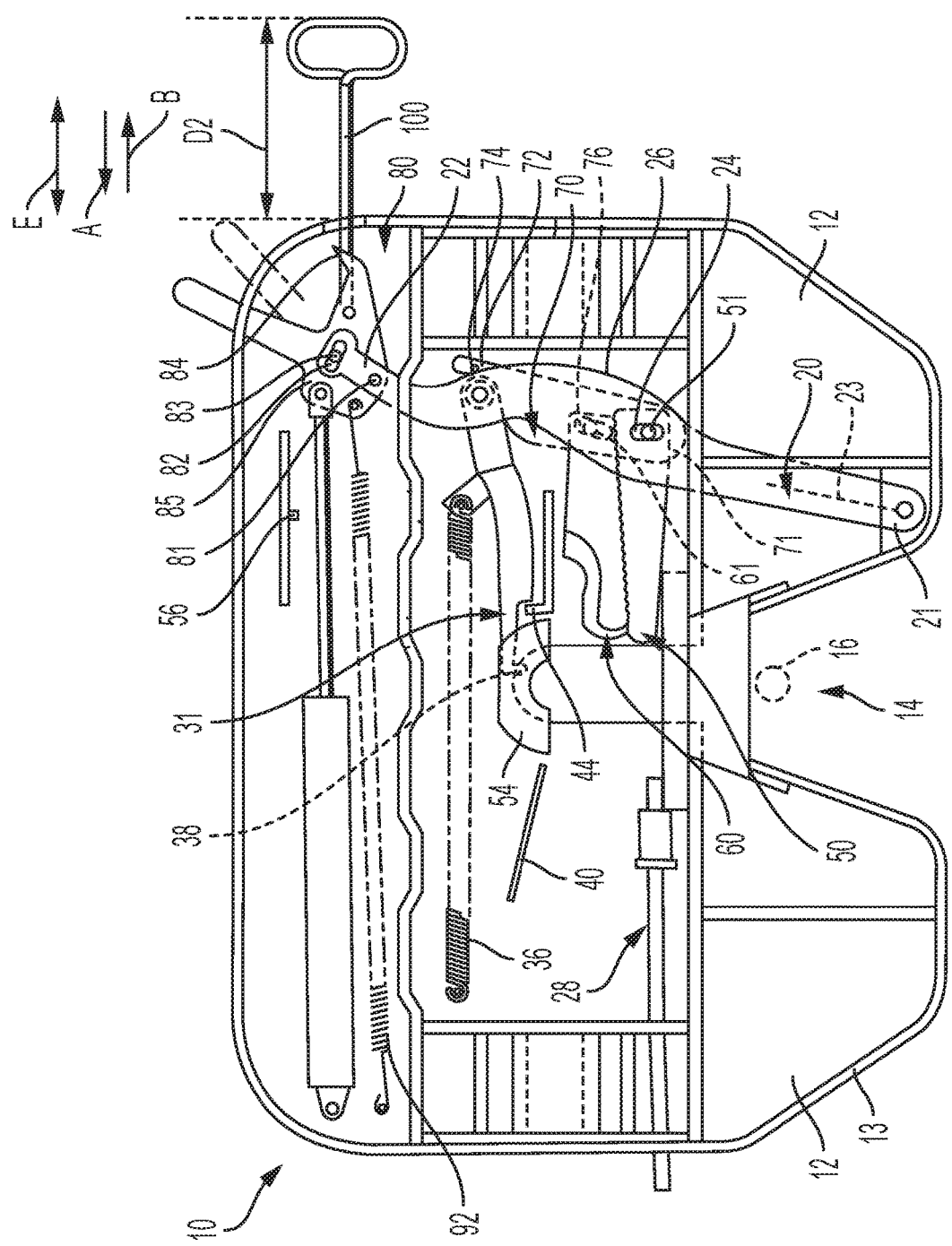
FIG. 2 is an underside view of the fifth wheel of FIG. 1 in an unlocked position.

FIGS. 1-2 depict underside views of an example fifth wheel 10 of the present disclosure. The fifth wheel 10 includes a top plate 12, a perimetral flange 13, and a receiving throat 14 in which a kingpin 16 of a towed trailer is received. The top plate 12 can include a variety of stabilizing and strengthening structures, such as gussets, flanges, ribs, and the like, that strengthen and support the top plate 12 and the perimetral flange 13 and provide point(s) of attachment for various components of the fifth wheel 10. The top plate 12 and the perimetral flange 13 define a protected space in which operable components of the fifth wheel 10 are positioned.

An operating arm 20 is pivotally connected to the top plate 12 at a pivot axis 23. The operating arm 20 is pivotable into and between a locked position (FIG. 1) in which the fifth wheel 10 couples to the kingpin 16 and an unlocked position (FIG. 2) in which the fifth wheel 10 decouples from the kingpin 16 (the locked and unlocked positions are described further herein). The operating arm 20 has a first end 21 pivotally coupled to the top plate 12 at the pivot axis 23 via a mechanical fastener such as a pin or bolt. The first end 21 is adjacent to the throat 14. The operating arm 20 is elongated between the first end 21 and an opposite, second end 22. A coil spring 36 biases (e.g. pulls) the operating arm 20 toward the throat 14 in a first direction (see arrow A).

A handle 100 is coupled to the operating arm 20 and is operable to pivot the operating arm 20 from the locked position (FIG. 1) to the unlocked position (FIG. 2). Specifically, the handle 100 is pulled in a second direction (see arrow B) such that the operating arm 20 pivots toward the unlocked position (FIG. 2) and away from the throat 14. As the operating arm 20 pivots toward the unlocked position (FIG. 2), a wedge 50 and a jaw 60, which are pivotally coupled to the operating arm 20, also move away from the throat 14 (see arrow B). Accordingly, the kingpin 16 can be inserted into the throat 14 or removed from the throat 14. When the kingpin 16 is inserted into the throat 14, the operating arm 20 pivots back to the locked position (FIG. 1), due to the coil spring 36 exerting a pulling force on the operating arm 20. As the operating arm 20 pivots toward the locked position (FIG. 1), the wedge 50 and the jaw 60 move toward the throat 14 (see arrow A) such that the fifth wheel 10 couples to the kingpin 16 (described further herein). As the wedge 50 and the jaw 60 move toward the throat 14 (see arrow A), the wedge 50 urges the jaw 60 into contact with the kingpin 16 to thereby force the kingpin 16 against a fixed jaw 54 on the top plate 12 and clamp the kingpin 16 between the jaw 60 and the fixed jaw 54.

The wedge 50 is pivotally coupled to the operating arm 20 between the ends 21, 22 of the operating arm 20 by a wedge pin 51 that is received in a first slot 24 of the operating arm 20. The wedge pin 51 slides in the first slot 24 as the operating arm 20 pivots such that the wedge 50 linearly moves (see direction arrow E). In certain examples, a knock-out assembly 28 is coupled to the top plate 12 and can be actuated to apply a direct force to the wedge 50 to thereby dislodge the wedge 50 and/or the operating arm 20 in the event either component becomes jammed and prevents the release of the kingpin 16 from the fifth wheel 10.

The jaw 60 is also pivotally coupled to the operating arm 20 via a timing lever 70. The jaw 60 has a jaw pin 61 that is received in an elongated slot 76 of the timing lever 70 and a first end 71 pivotally coupled to the operating arm 20 via the wedge pin 51 (see above). As the operating arm 20 pivots, the wedge 50 moves (as described above), the timing lever 70 pivots about wedge pin 51, the jaw pin 61 slides in the elongated slot 76, and the jaw 60 moves with the wedge 50. The timing member 70 has an opposite, second end 72 with a follower pin 74 extending therefrom that slides along an outside edge 26 of the operating arm 20 as the operating arm 20 pivots. The timing lever 70 is biased toward the throat 14 with an extension spring 78. The operating arm 20, the wedge 50, and the timing lever 70 are all generally plate-like members and are in stacked relation to one another. Reference is made to above-incorporated U.S. Pat. No. 5,641,174 for description and operation of a conventional timing lever and associated components.

A trigger arm 31 is pivotally coupled to the operating arm 20 and is for holding the operating arm 20 in the unlocked position (FIG. 2). The trigger arm 31 extends transverse to the throat 14 and slides on a bottom plate 40 as the operating arm 20 pivots into and between the locked position (FIG. 1) and the unlocked position (FIG. 2). The trigger arm 31 has a trigger 38 that moves into the throat 14 as the operating arm 20 pivots toward the unlocked position (FIG. 2). The trigger 38 prevents the operating arm 20 from pivoting back to the locked position (FIG. 1) until the kingpin 16 inserted into the throat 14. Specifically, when the kingpin 16 is received into the throat 14, the kingpin 16 contacts and moves the trigger 38 out of the throat 14 causing the trigger arm 31 to pivot relative to the operating arm 20 and the trigger 38 to clear a second bottom plate 44. The trigger arm 31 then slides along the bottom plate 40 and the operating arm 20 pivots back toward the locked position (FIG. 1) as the coil spring 36 "pulls" the operating arm toward the throat 14. In the example depicted in FIG. 1, the trigger 38 is a finger member that projects from the trigger arm 31. The coil spring 36 is shown connected to the trigger arm 31, however, in other examples the coil spring 36 is directly connected to the operating arm 20.

The operating arm 20 is held or locked in the locked position (FIG. 1) with a secondary lock assembly 80 that is pivotally coupled to the second end 22 of the operating arm 20 via pin 81. The secondary lock assembly 80 has a pawl member 84 and an opposite, dog member 85 that each radially extend away from a stabilizing pin 83 that is received in an arcuate slot 82 defined in the second end 22 of the operating arm 20. A coil spring 92, connected between the secondary lock assembly 80 and a flange on the top plate 12, exerts a pulling force in the first direction (see arrow A) to thereby urge the secondary lock assembly 80, and further urge the operating arm 20, toward the locked position (FIG. 1) and in the first direction (see arrow A).

In operation, as the operating arm 20 pivots from the unlocked position (FIG. 2) toward the locked position (FIG. 1) the secondary lock assembly 80 and the pull handle 101 both move in the first direction (see arrow A) and the pawl member 84 seats behind a stop surface 56 on the top plate 12 to thereby stop or prevent the operating arm 20 from thereafter pivoting in the opposite second direction (see arrow B) toward the unlocked position (FIG. 2). As such, the handle 100 is retracted into the fifth wheel 10 and extends a first distance D1 (FIG. 1) from the fifth wheel 10. To pivot the operating arm 20 to the unlocked position (FIG. 2), the pawl member 84 must be pivoted about pin 81 to clear the stop surface 56. The handle 100 is coupled to the secondary lock assembly 80 in such a way that as the operator pulls the handle 100 in a second direction (see arrow B) the pawl member 84 pivots about pin 81 to clear the stop surface 56 and the operating arm 20 is free to pivot to the unlocked position (FIG. 2). As such, the kingpin 16 can be received into or moved out of the fifth wheel 10. When the operating arm 20 is in the unlocked position (FIG. 2), the handle 100 extends a second distance D2 from the fifth wheel 10. The second distance D2 is greater than the first distance D1 (FIG. 1).

As noted above, the handle 100 moves (e.g. retracts) into the fifth wheel 10 as the operating arm 20 pivots to the locked position (FIG. 1). However, once the operating arm 20 stops pivoting and is in the locked position (FIG. 1), the handle 100 abruptly stops moving and the fifth wheel 10 generates a measurable vibration or shock event. Specifically, when the operating arm 20 stops pivoting various components of the fifth wheel 10 contact (e.g. knock against) one another and/or the kingpin 16 thereby causing or generating one or more vibrations. For example, the kingpin 16 may contact the fixed jaw 54 thereby creating a vibration, the jaw 60 may stop moving such that the jaw pin 61 stops the operating arm 20 from pivoting and contact of the jaw pin 61 with the operating arm 20 creates a vibration, the pawl member 84 seats behind the stop surface 56 on the top plate 12 thereby generating a vibration, and/or the handle 100 stops moving when the operating arm 20 stops pivoting thereby creating a vibration.

Through research and experimentation the present inventors have discovered that the vibrations generated by the fifth wheel 10 have specific vibration components (e.g., g-force, velocity, frequency, magnitude, vibration signature) when proper coupling of the fifth wheel 10 to the kingpin 16 occurs. That is, the vibrations generated by the fifth wheel 10 when proper coupling occurs are different than the vibrations generated when improper coupling occurs. As such, the present inventors have developed the methods and systems of the present disclosure for monitoring and indicating the status of coupling between the fifth wheels 10 and the kingpin 16 (e.g., proper and complete coupling, improper and incomplete coupling) based on the vibrations generated by the fifth wheel 10, such as the vibrations generated by a moveable component of the fifth wheel 10 (e.g., the handle 100).

In one specific example, the present inventors have recognized that the handle 100 will achieve a maximum velocity as the handle 100 retracts into the fifth wheel 10 due to the known spring force and distances the handle 100 moves relative to the fifth wheel 10 as the fifth wheel 10 moves from the unlocked position (FIG. 2) to the locked position (FIG. 1), as described above. When fifth wheel 10 reaches the locked position (FIG. 1), the movement of the handle 100 will abruptly end and thereby generate a fairly predictable vibration that is indicative of proper coupling of the fifth wheel 10 to the kingpin 16. However, if the handle 100 does not fully retract into the fifth wheel 10 due to improper coupling of the fifth wheel 10 to the kingpin 16, the handle 100 does not reach the maximum velocity and therefore the handle 100 does not generate the same vibration that is generated when proper coupling occurs (e.g., if the handle 100 does not fully retract in the fifth wheel 10, the magnitude of the vibrations generated by the handle 100 are smaller in comparison to when proper coupling occurs).

Figure 3:
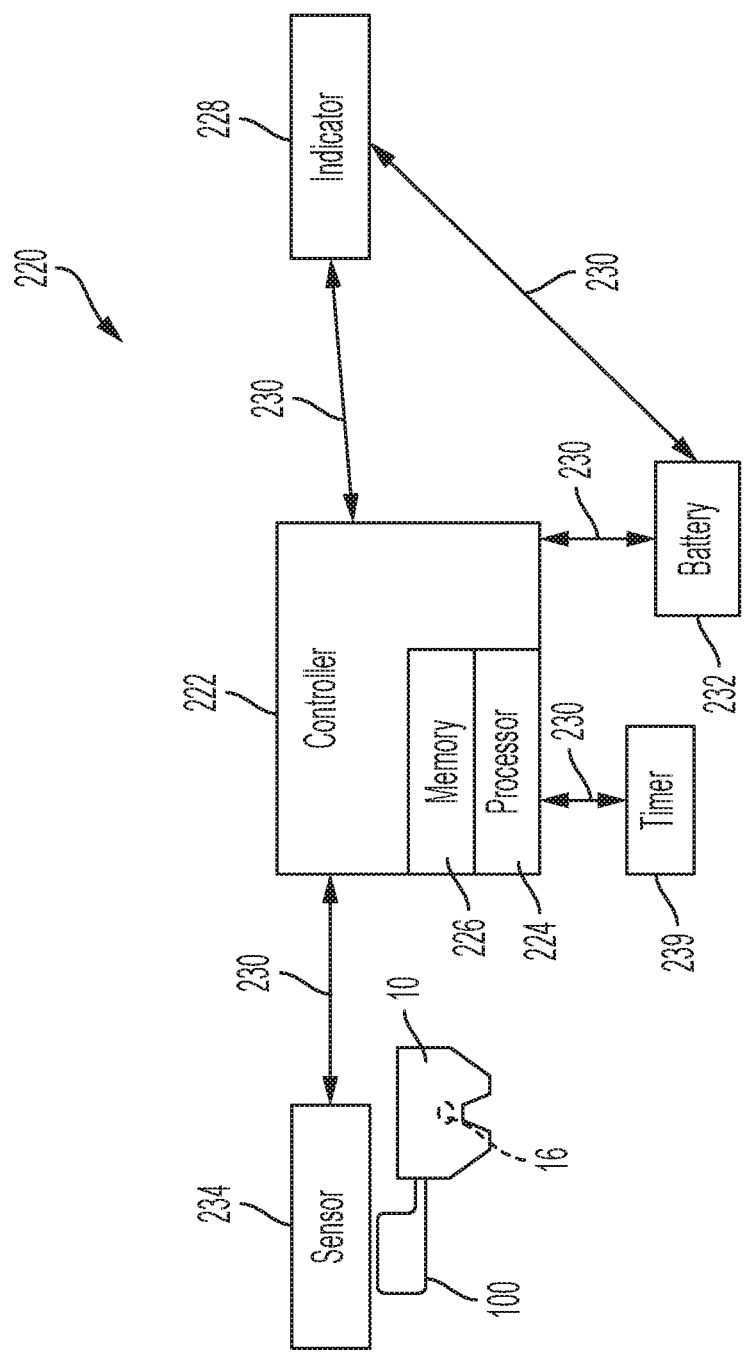
FIG. 3 is an example system of the present disclosure.

Referring now to FIG. 3, a schematic of an example system 220 for monitoring coupling of the fifth wheel 10 to the kingpin 16 is shown. Generally, the system includes a sensor 234 in operative association with the fifth wheel 10 that is configured to sense the vibrations generated by the fifth wheel 10 when the fifth wheel 10 couples to the kingpin 16. The sensor 234 outputs or generates vibration data that correspond to the sensed vibrations. A controller 222 receives the vibration data and processes the vibration data to detect or determine presence or absence of a predetermined vibration component that is known to occur when the fifth wheel 10 properly couples to the kingpin 16. If the predetermined vibration component is present, the controller 222 controls an indicator 228 to thereby indicate proper coupling of the fifth wheel 10 to the kingpin 16. In certain examples, if the predetermined vibration component is absent the controller 222 controls the indicator 228 to thereby indicate improper coupling. The sensor 234, the indicator 228, the controller 222, and other components of the system 220 are described in greater detail hereinbelow.

As noted above, the sensor 234 is in operable association with the fifth wheel 10, and in the example depicted in FIG. 3, the sensor 234 is connected to the handle 100. However, a person of ordinary skill in the art will recognize that the sensor 234 can be connected to any component of the fifth wheel 10 and/or be connected to the towing vehicle or the towed vehicle so long as the sensor 234 is capable of sensing vibrations generated by the fifth wheel 10. The sensor 234 is a device capable to sensing vibrations and/or specific components of the vibrations (e.g., force, magnitude, velocity, acceleration, vibration signature, vibration frequency), generated by the fifth wheel 10. Furthermore, the specific sensor 234 used in the system 220 may depend on the vibration components that will be sensed. For example, an accelerometer is used to sense g-force of the vibration. Examples of conventional accelerometers that may be used in the system 220 are manufactured by ST (model H3LIS200DL) and Bosch Sensortec (model BMA253). In other examples, the sensor 234 is a piezoelectric sensor. Note that certain sensors 234 may sense more than one component of the vibration. Furthermore, more than one sensor may be used in the system 220 (e.g., multiple sensors 234 are used for redundancy and error checking other sensors 234). The sensor 234 generates or outputs vibration data in the form of analog signals or digital signals, depending on the type of sensor 234 used. In certain examples, sensor 234 is configured to ignore vibrations that to do not meet a predetermined threshold magnitude or amplitude (e.g., the sensor 234 may sense vibrations related to roadway noise but the sensor 234 ignores these vibrations and does not output vibration data for these vibrations). In certain examples, the vibrations sensed by the sensor 234 are in the audible frequency.

As noted above, the sensor 234 generates or outputs vibration data to the controller 222 which is configured to process the vibration data. The controller 222 includes a processor 224 and a memory 226, and the controller 222 can be located anywhere in the system 220. The controller 222 is in communication with the various components of the system 220 via wired and/or wireless communication links. In certain examples, the system 220 includes more than one controller 222. The controller 222 includes a timer or counter 239 such that velocity and/or distance traveled can be determined based on the vibration data received from the sensor 234. The controller 222 is also configured to receive inputs from other components in the system 220 such as an operator input device (not shown) and/or the indicator 228. The controller 222 and the indicator 228 are powered by a battery 232.

The controller 222 processes the vibration data to detect a presence or an absence of a predetermined vibration component within the vibration data. The predetermined vibration component corresponds to at least one component of the vibration that is generated by the fifth wheel 10 when the fifth wheel properly couples to the kingpin 16. For example, the predetermined vibration component is a magnitude, amplitude, dominant frequency component, or some other component of the vibration that is generated each time the fifth wheel 10 properly couples to the kingpin 16. However, in the event that improper coupling of the fifth wheel 10 to the kingpin 16 occurs, the sensed vibration does not include the predetermined vibration component. Accordingly, the presence of the predetermined vibration component in the vibration data is indicative of proper coupling of the fifth wheel 10 to the kingpin 16. As such, coupling status (e.g., proper or improper coupling) can be determined by the controller 222 based on the presence or absence of the predetermined vibration component. The predetermined vibration component is inputted into the controller 222 and stored on the memory 226. In operation, the controller 222 processes the vibration data in relation to the predetermined vibration component to thereby determine if proper or improper coupling of the fifth wheel 10 to the kingpin 16 has occurred. For example, the controller 222 processes the vibration data to identify one or more sensed vibration components and compares the sensed vibration components to the predetermined vibration components.

In certain examples, the predetermined vibration component is determined based on controlled, repeatable tests in which the fifth wheel 10 properly couples to the kingpin 16. Accordingly, the predetermined vibration component can be identified by examining the vibration data from each test. The predetermined vibration component is then inputted into the controller 222. In other examples, the controller 222 is configured to "learn" the predetermined vibration component based on repeated coupling events between the fifth wheel 10 and the kingpin 16.

After the controller 222 determines the coupling status of the fifth wheel 10 to the kingpin 16, the controller 222 controls the indicator 228 to thereby indicate the coupling status to the operator. That is, when the controller 222 determines that the predetermined vibration component is present in the vibration data the indicator 228 indicates that proper coupling has occurred, and when the controller 222 determines that the predetermined vibration component is absent the controller 222 indicates that improper coupling has occurred. The indicator 228 is any suitable indicator, such as a visual indicator (e.g. LED), audio indicator (e.g. speaker), or any other indicator capable of indicating to the operator. Specifically, the indicator 228 may produce an audible alert and/or a visual alert. In certain examples, the indicator 228 is part of the drive system of the towing vehicle. The location of the indicator 228 can vary, such as on the fifth wheel 10 or in the cab on the towing vehicle.

Figure 4:
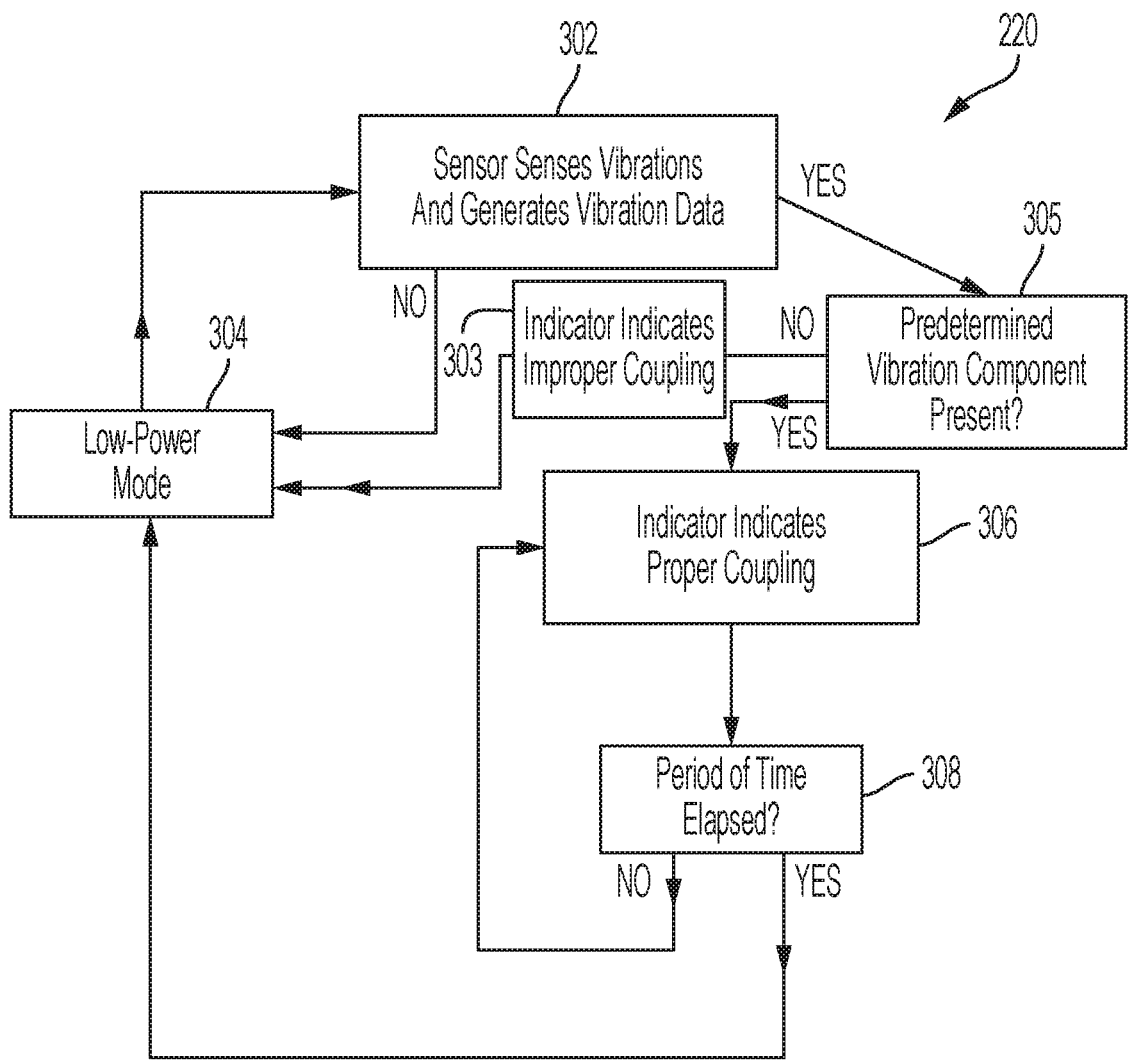
FIG. 4 illustrates a method according to the present disclosure for monitoring and indicating coupling of the fifth wheel and to a kingpin.

Referring now to FIG. 4, an example method for monitoring coupling the fifth wheel 10 to the kingpin 16 (FIG. 1) is depicted. As shown at 302, the method begins with the sensor 234 sensing vibrations generated by the fifth wheel 10 and generating vibration data which is received by the controller 222. Optionally, if no vibration data is received, the controller 222 enters a low-power mode to conserve power, shown at 304. If vibration data is received, the controller 222 processes (e.g. compares) the vibration data to the predetermined vibration component stored on the memory 226, at box 305. If the controller 222 determines the predetermined vibration component is absent from the vibration data, the controller 222 controls the indicator 228 to thereby indicate improper coupling has occurred (shown at 303) and the controller 222 thereafter enters the low-power mode (shown at 304). The controller 222 remains in the low-power mode until the sensor 234 senses additional vibrations. However, if the controller determines that the predetermined vibration component is present in the vibration data, the controller 222 controls the indicator 228 to thereby indicate proper coupling has occurred (shown at 306). The method further includes determining when a predetermined activation time period stored on the memory 226 (e.g., 30.0 seconds, 2.0 minutes) has elapsed since activation of the indicator 228. If the activation time period has not expired, the method returns to box 306 and the indicator 228 continues to indicate proper coupling to the operator. If the activation time period has expired, the method includes placing the controller 222 in low-power mode, shown at box 304.

In other methods, the controller 222 can be further configured to process the vibration data using spectral analysis, such as a Fast Fourier Transform (FFT)), to determine spectral data with various components (e.g., amplitudes, frequency ranges, dominant frequency components). The controller 222 further processes the spectral data with reference to the predetermined vibration component, which can be a predetermined spectral signature. As such, the controller 222 can determine the coupling status of the fifth wheel 10 based on the spectral data and the predetermined spectral signature or components thereof.

Figure 5:
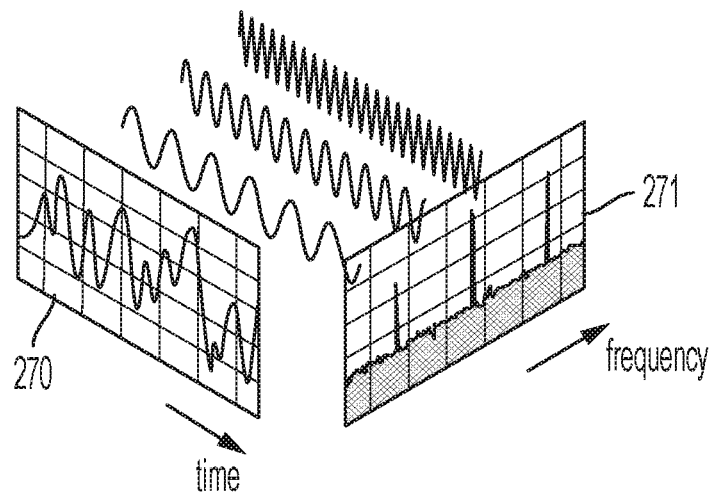
FIG. 5 depicts an example predetermined vibration signature and graphical representations of amplitude spectrum that is generated by a controller.
Figure 6:
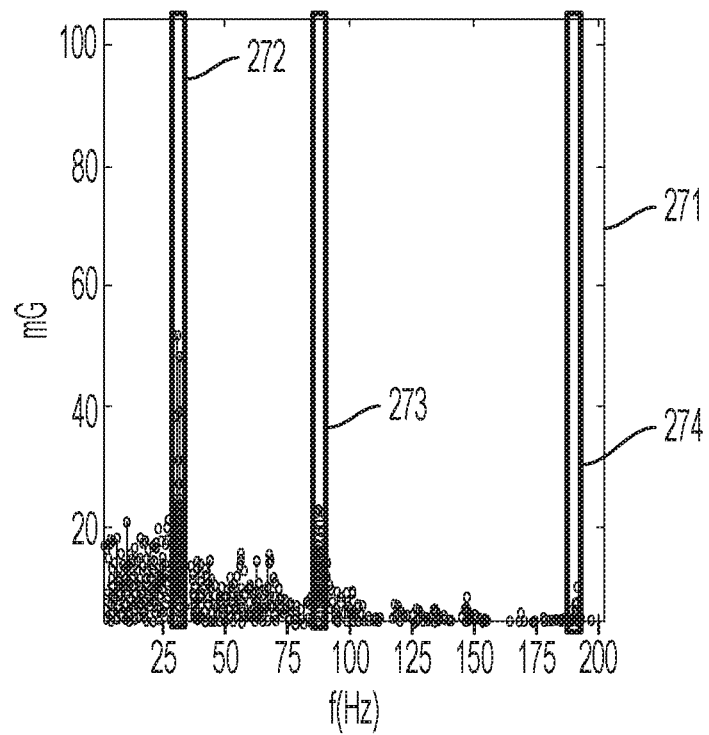
FIG. 6 is an enlarged view of a time section of vibration data converted to the frequency domain.

FIG. 5 depicts an example vibration data recorded during coupling exhibiting a predetermined vibration signature (see graph labeled 270) that corresponds to vibrations generated when the fifth wheel 10 properly couples to the kingpin 16. FIG. 6 depicts the transformation of the vibration data to the frequency domain, such as via Fast Fourier Transform (FFT). The data demonstrates a predetermined vibration signature, which is a spectral signature exhibiting threshold amplitudes at certain frequencies or frequency ranges. In the example depicted in FIG. 6, the predetermined spectral signature has three dominant frequency components exhibiting threshold amplitude characteristics (see numbers 272, 273, 274). The first dominant frequency 272 has an amplitude of approximately 50.0 mG and is in the frequency range of 25.0-50.0 Hz, the second dominant frequency 273 has an amplitude of approximately 25.0 mG and is in the range of 75.0-100.0 Hz, and the third dominant frequency 274 has an amplitude of approximately 7.0 mG and is in the frequency range of 175.0-200.0 Hz. A person of ordinary skill in the art will recognize that the number, amplitude, and/or frequency range of the dominant frequencies may vary. Different fifth wheels 10 coupling to different kingpins 16 may result in different predetermined spectral signatures and/or different dominant frequency components. Accordingly, the frequency ranges, number of dominant frequency components, and/or amplitude thresholds may be variously set as appropriate for monitoring coupling for a particular fifth wheel, kingpin, and/or trailer.

As noted above, the controller 222 can be configured to further process the vibration data from the sensor 234 using spectral analysis, such as a Fast Fourier Transform (FFT)), to generate spectral data of a time section of the vibration data. The controller 222 may further process the spectral data to thereby identify different components thereof which may be compared to components of the predetermined spectral signature. As such, when components of the predetermined spectral signature are present in the spectral data the controller 222 can determine that proper coupling of the fifth wheel 10 to the kingpin 16 has occurred and indicate the same via the indicator 228. In one example, the controller 222 may process the spectral data to identify the highest amplitude spectral component(s) and then compare those dominant frequencies to the spectral component(s) of the predetermined spectral signature. In another example, the controller 222 may process the spectral data to identify the maximum amplitude and then compare the maximum amplitude to the maximum amplitude defined by a predetermined spectral signature. In other examples, the controller 222 identifies at least one dominant frequency component in the spectral data that corresponds to the vibration data. The identified dominant frequency component is then compared to a predetermined dominant frequency in the predetermined spectral signature. Note that in certain examples the predetermined dominant frequency component has an amplitude that is more than a predetermined magnitude, or more than a predetermined amount greater than amplitudes within a preselected frequency range (e.g., the predetermined dominant frequency component has an amplitude three times greater than the amplitudes in a preselected frequency range, such as a mean or median amplitude in that preselected frequency range). In other examples, the controller 222 may process the vibration data to identify the predetermined vibration component in the time domain. For example, a peak pattern is identified and then compared to the peak pattern of the predetermined spectral signature.

The controller 222 may also be configured to identify a time section of the vibration data on which to perform spectral analysis. The time section is a predetermined amount of vibration data surrounding a "trigger" that initiates the time section. In certain examples, the time section includes vibration data that occurs after the trigger event occurs. The amount of vibration data included in the time section after the trigger event occurs can vary, such as 0.5 second, 1.5 seconds, or 4.0 seconds. In other examples, the time section will include vibration data that is forward and backward relative to the trigger event (e.g., the time section of vibration data will include vibration data before and after the trigger event). The amount of vibration data included in the time section before and after the trigger can vary. For example, the time section includes 0.2 seconds of vibration data before the trigger event and 1.5 seconds of vibration data after the trigger event. In another example, the time section included 1.0 second of vibration data before the trigger event and 1.0 second of vibration data after the trigger event. The time section of the vibration data can be triggered by movement of a movable component of the fifth wheel 10, such as the handle 100. The time section of the vibration data can also be triggered by one or more vibration amplitudes identified by the controller 222. In certain examples, the triggering vibration amplitudes are greater than a predetermined threshold vibration amplitude (e.g., the predetermined threshold vibration amplitude is greater than 20.0 mG).

Figure 7:
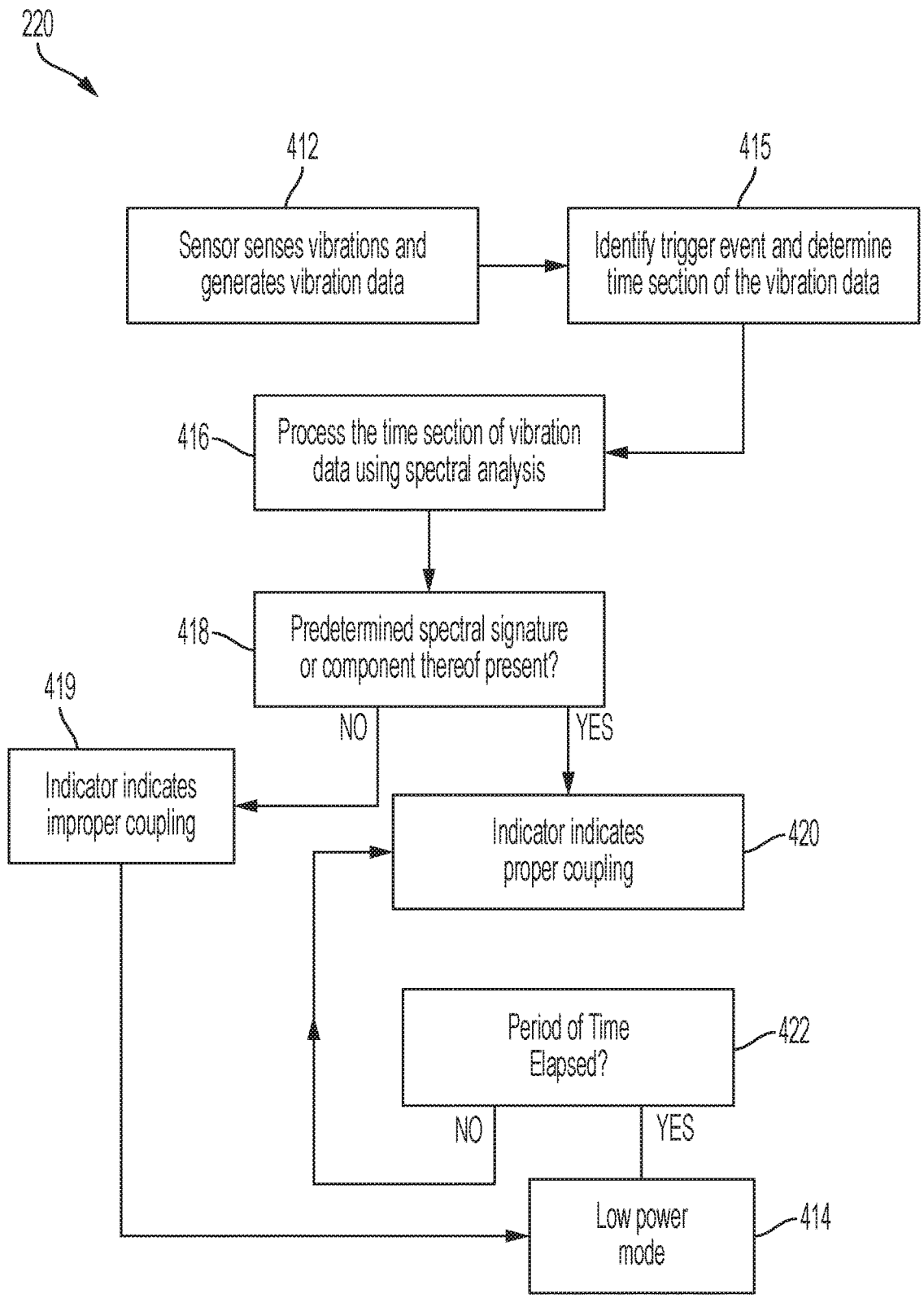
FIG. 7 illustrates another method according to the present disclosure for monitoring and indicating coupling of the fifth wheel and to the kingpin.

Referring to FIG. 7, an example method for monitoring coupling the fifth wheel 10 to the kingpin 16 (FIG. 1) is depicted. The method begins with the sensor 234 sensing vibrations generated by the fifth wheel and generating vibration data that is received by the controller 222, shown at 412. The controller 222 identifies the trigger event in the vibration data (e.g. a triggering vibrating amplitude greater than a predetermined threshold vibration amplitude). A time section of vibration data is identified based on the trigger, shown at 415. The amount of the vibration data included in the time section before and/or after the trigger event is predetermined. The controller 222 then processes the time section of vibration data using spectral analysis (such as a Fast Fourier Transform (FFT)) and generates spectral data, shown at 416. The controller 222 then determines if the spectral data, or a component thereof, matches the predetermined spectral signature, or component thereof, stored in the memory 226, shown at 418. If the controller 222 determines the predetermined spectral signature, or component thereof, is absent from the spectral data, the controller 222 controls the indicator 228 to thereby indicate improper coupling has occurred (shown at 419) and the controller 222 enters a low-power mode (shown at 414) to conserve power. If the controller 222 determines that the predetermined spectral signature, or component thereof, is present in the spectral data the controller 222 controls the indicator 228 to thereby indicate proper coupling has occurred (shown at 420). Optionally, the method further includes determining when a predetermined activation time period stored on the memory 226 (e.g., 30.0 seconds, 2.0 minutes) has elapsed since activation of the indicator 228. If the activation time period has not expired, the method returns to box 420 and the indicator 228 continues to indicate proper coupling. If the activation time period has expired, the method includes placing the controller 222 in low-power mode, shown at 414.

Figure 8:
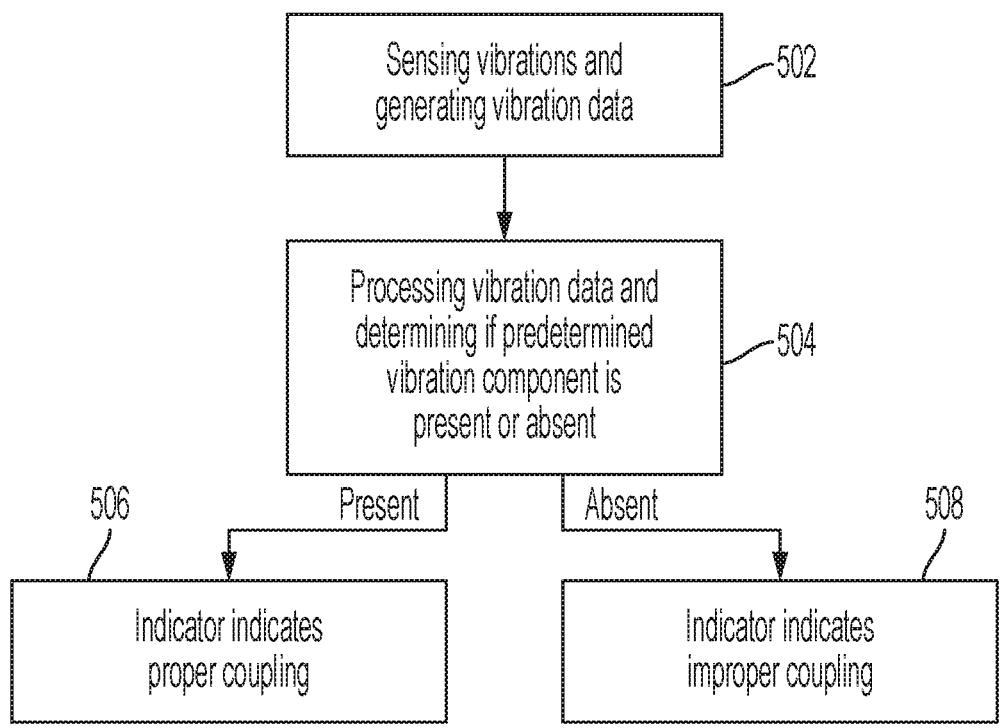
FIG. 8 illustrates another method according to the present disclosure for monitoring and indicating coupling of the fifth wheel and to the kingpin.

Referring to FIG. 8, an example method for monitoring coupling the fifth wheel 10 to the kingpin 16 (FIG. 1) is depicted. The method begins with the sensor 234 sensing vibrations generated by the fifth wheel 10 and generating vibration data that is received by the controller 222, shown at 502. The controller 222 then processes the vibration data to thereby detect the presence or absence of the predetermined vibration component, which is a predetermined spectral signature, in the vibration data, shown at 504. If the predetermined vibration component is present, the controller 222 controls the indicator 228 to thereby indicate that proper coupling has occurred, shown at 506. However, if the predetermined vibration component is absent, the controller 222 controls the indicator 228 to thereby indicate that improper coupling has occurred, shown at 508. Optionally, the processing step, shown at 504, can include performing spectral analysis and/or determining a time section (described above). The processing step can also include processing of the vibration data to identify at least one dominant frequency component and thereby comparing the identified dominant frequency component to a predetermined dominant frequency component.

Figure 9:
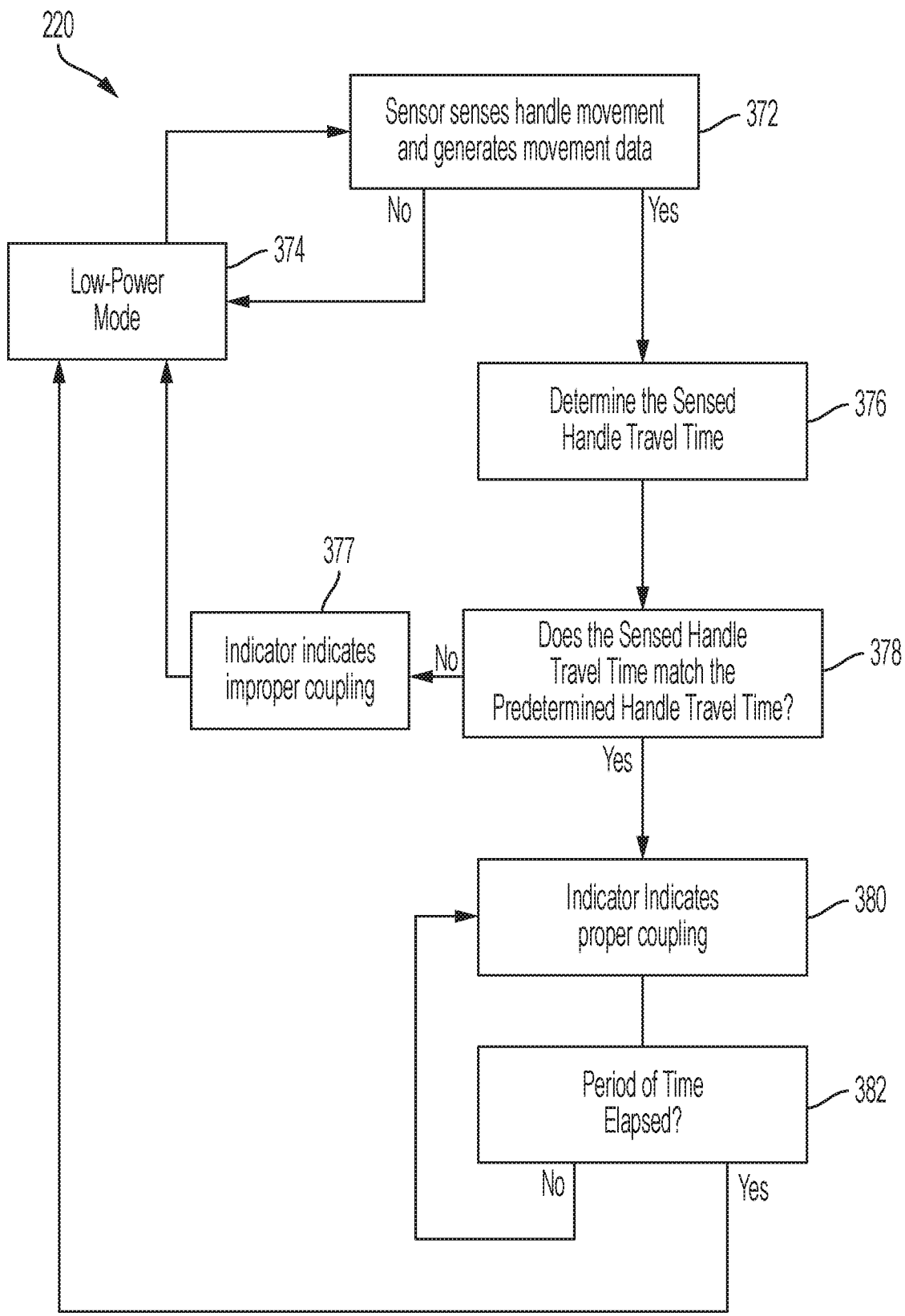
FIG. 9 illustrates another method according to the present disclosure for monitoring and indicating coupling of the fifth wheel and to the kingpin.

Referring to FIG. 9, another example method for monitoring and indicating proper coupling of the fifth wheel 10 to the kingpin 16 (FIG. 1) is depicted. The present inventors have recognized that when the fifth wheel 10 properly couples to the kingpin 16, the handle 100 moves from the fully extended position (FIG. 2) to the fully retracted position (FIG. 1) during a specific time period. This time period (referred to herein as a predetermined handle travel time) is the same each time the handle 100 moves from the fully extended position to the fully retracted position. The predetermined handle travel time is directly related to the known maximum velocity of the handle 100 and the known distance traveled by the handle 100. However, if improper or incomplete coupling occurs, the time period during which the handle 100 moves (referred to herein as sensed handle travel time) is less than the predetermined handle travel time. The sensed handle travel time is less than the predetermined handle travel time because the maximum velocity of the handle 100 and/or the distance traveled by the handle 100 when improper coupling occurs is less when compared to when proper coupling occurs.

In this method, the indicator 228 is configured to indicate proper coupling between the fifth wheel 10 and the kingpin 16 when the sensed handle travel time is equal to the predetermined handle travel time. As shown at 372, the method begins with a sensor 234 sensing movement of the handle 100 and generating movement data that is received by the controller 222. Optionally, if no movement data is received from the sensor 234, the controller 222 enters a low-power mode to conserve power, shown at 374. If the controller 222 receives movement data, the controller 222 determines the sensed handle travel time, shown in 376 (e.g., the controller 222 determines that the handle 100 moved for 0.3 seconds). The controller 222 then compares the sensed handle travel time to the predetermined handle travel time stored in the memory 226, shown at 378 (e.g., predetermined handle travel time stored in the memory is 0.4 seconds). If the sensed handle travel time does not equal the predetermined handle travel time, the controller 222 controls the indicator 228 to thereby indicate improper coupling has occurred (shown at 377). The controller 222 then enters the low-power mode to conserve power, shown at 374, until the sensor 234 senses additional movement of the handle 100. However, if the sensed handle travel time equals the predetermined handle travel time, the controller 222 controls the indicator 228, shown at 380, to thereby indicate that proper coupling has occurred.

As shown in box 382, the method includes determining, with the timer 239 (FIG. 3), whether an activation time period stored on the memory 226, such as 30 seconds or 2.0 minutes, has elapsed since activation of the indicator 228. If the activation time period has not expired, the method returns to box 380 and the indicator 228 continues to indicate to the operator, shown at 380. If the activation time period has expired, the method includes placing the system 220 in low-power mode, shown at 374).

Figure 10:
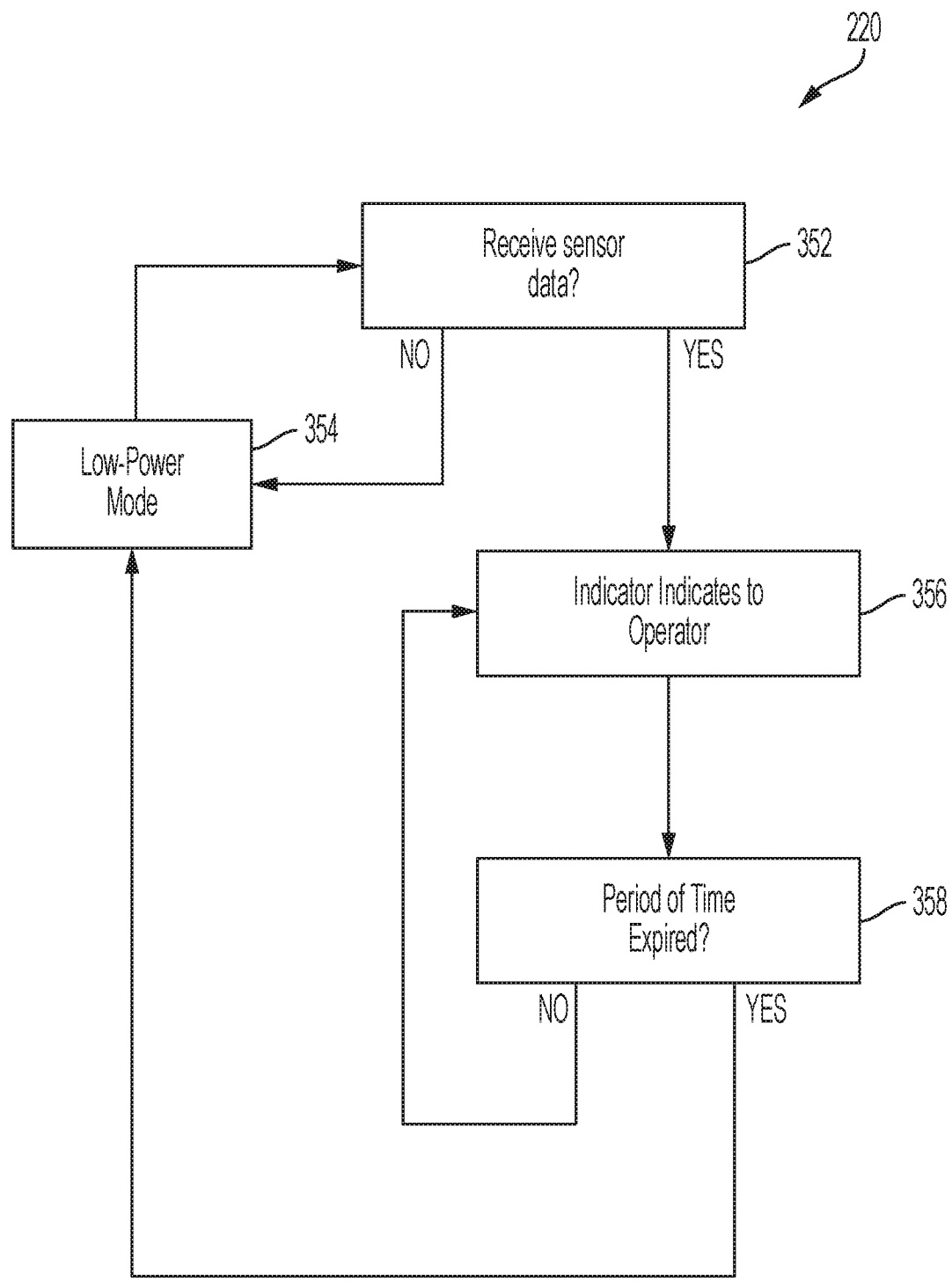
FIG. 10 illustrates another method according to the present disclosure for monitoring and indicating coupling of the fifth wheel and to the kingpin.
Figure 11:
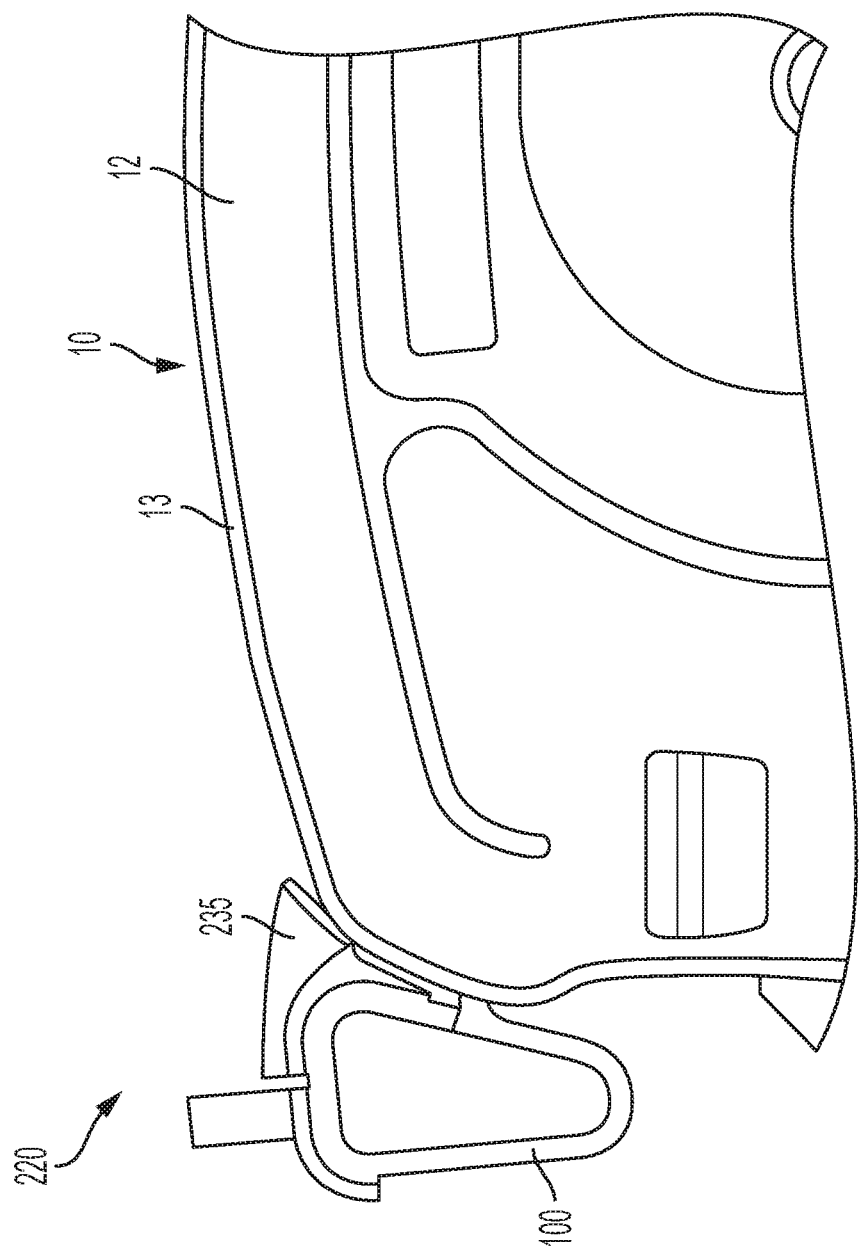
FIG. 11 is an enlarged partial view of an example fifth wheel in the locked position with a handle in a fully retracted position.

FIG. 10 depicts another example method (described further herein) for indicating proper coupling between the fifth wheel 10 and the kingpin 16 (FIG. 1). In this example, a proximity sensor 235 is disposed in a horn-shaped portion of an enclosure (see FIG. 11). The proximity sensor 235 can be any suitable proximity sensor 235, such as an induction or magnetic proximity sensor. The specific proximity sensor 235 utilized in each application may include varying numbers of coils and spacing therebetween to thereby vary the desired frequency and/or capacitance and optimize the proximity sensor 235 for the specific application. An example of a conventional proximity sensor is manufactured by Texas Instruments (model LDCCOILEVM). The present inventors have recognized that when proper coupling occurs, the handle 100 is positioned near the perimetral flange 13 of the fifth wheel 10 (FIG. 11). However, if improper coupling occurs, the handle 100 is positioned slightly further away (e.g., offset) from the perimetral flange 13. For example, the sensor 234 may be capable of sensing the perimetral flange 13 when the sensor 234 is 0.1 inch away from the perimetral flange 13 but unable to sense the perimetral flange 13 when the sensor 234 is more than 0.1 inches away. As such, the present inventors have developed methods for processing sensor input signals from a proximity sensor and thereby determining if proper coupling has occurred.

Referring specifically to FIG. 10, the method begins by receiving sensor data when the sensor 234 senses the perimetral flange 13 of the fifth wheel 10. If no sensor data is received, the controller 222 enters a low-power mode to conserve power, shown at 354. The controller 222 remains in the low-power mode until the sensor 234 senses the perimetral flange 13. If however, the controller 222 does receive a sensor data, the controller 222 sends an indicator control signal to the indicator 228, shown at 356, to thereby cause the indicator 228 to indicate to the operator that proper coupling has occurred.

As shown in box 358, the method includes determining, with the timer 239, whether an activation time period stored on the memory 226, such as 30 seconds or 2.0 minutes, has elapsed since activation of the indicator 228. If the activation time period has not expired, the method returns to box 356 and the indicator 228 continues to indicate to the operator, shown at 356. If the activation time period has expired, the method includes placing the system 220 in low-power mode, shown at 354.

Figure 12:
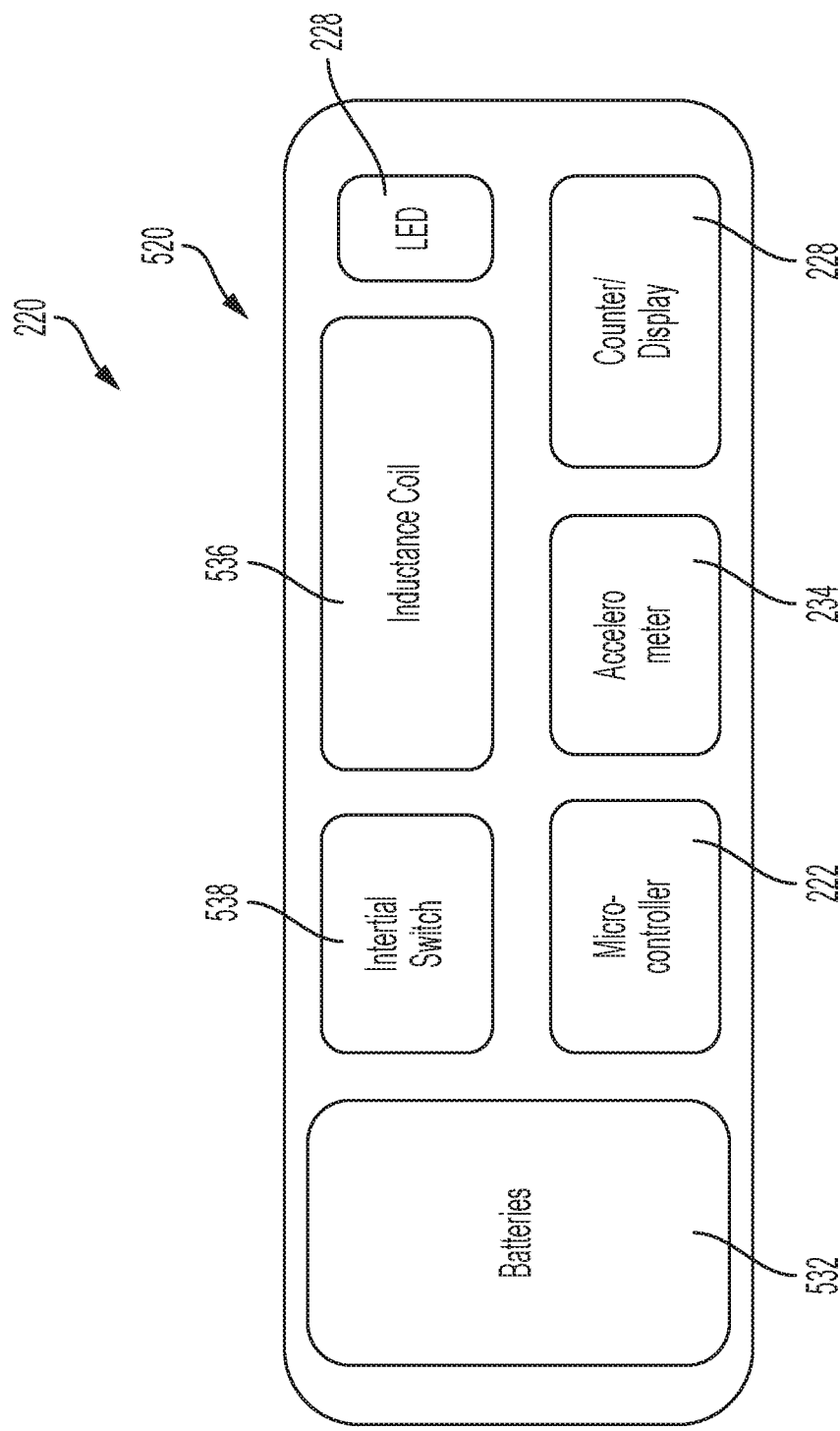
FIG. 12 is a schematic block diagram of an example indicator system.
Figure 16:
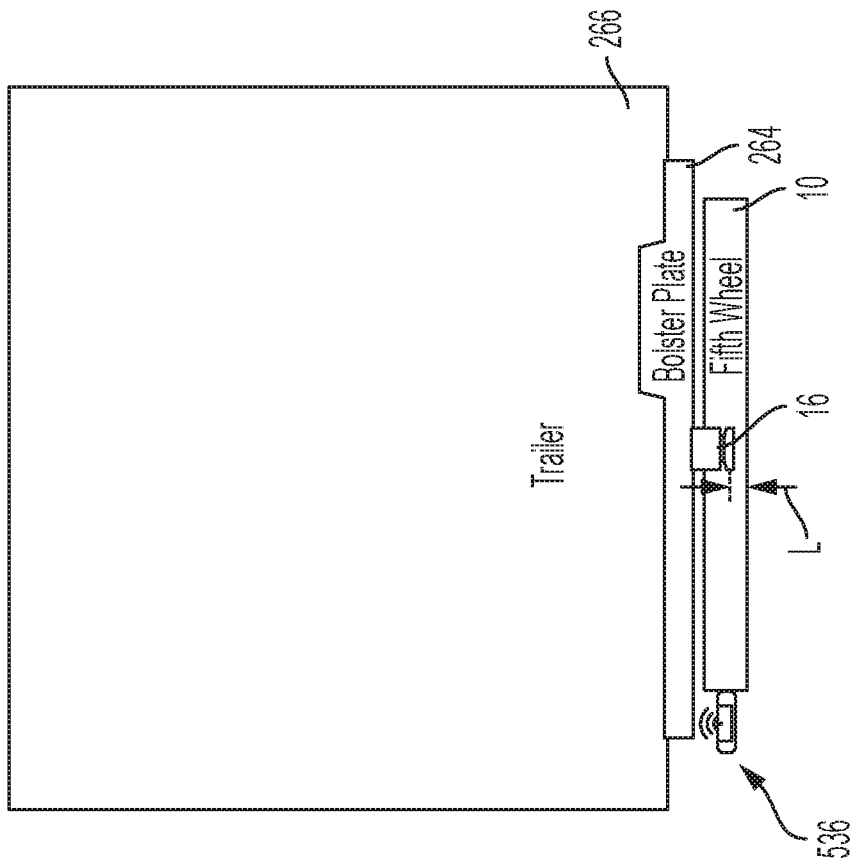
FIG. 16 is a schematic view of a bolster plate of a trailer body in close proximity to the fifth wheel.
Figure 17:
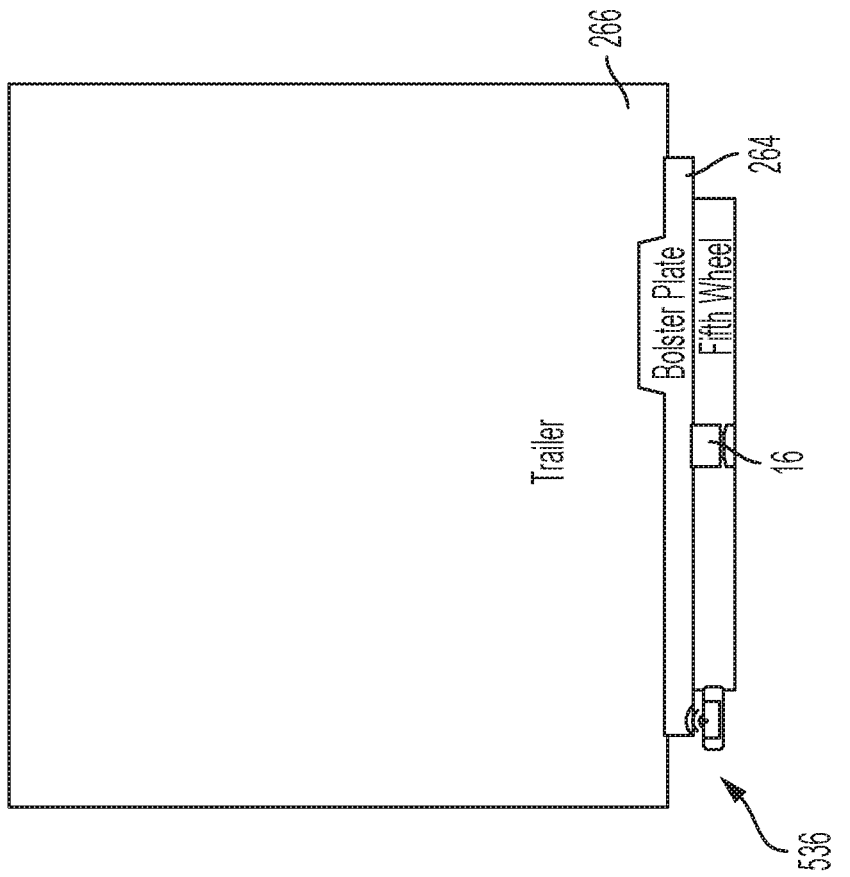
FIG. 17 is a schematic view of the bolster plate spaced apart from the fifth wheel.

Referring now to FIG. 12, a schematic block diagram of an example system 220 is depicted. The system includes batteries 532, the controller 222 (shown as a microcontroller), the sensor 234 (shown as an accelerometer), a pair of indicators 228 (shown as a counter/display such as an LCD screen and a LED), an inductance coil 536, and an inertial switch 538. All the components shown in FIG. 12 are in electrical communication with each other. When coupled with the proper frequency and capacitance, the inductance coils output a specific magnetic field. Any metal or conductive body that passes through the generated field distorts the field and the inductance coil 536 can determine the distortion. A relationship is then determined and the inductance coil 536 can act as a switch or a linear detection device. Therefore, if the inductance coil 536 is close to the top plate of the fifth wheel 10, interference of the signal occurs and a threshold or correlated distance value can be used to determine if the handle 100 is fully retracted. The inductance coil 536 can also be used in a different orientation (e.g., parallel to the ground) to sense a bolster plate 264 of the trailer 266 (referring to FIGS. 16 and 17). This would enable the system to run through a digital checklist related to a proper coupling or locking event. For example, if the switch 538 was triggered due to the handle 100 being fully retracted into the fifth wheel 10 but no bolster plate 264 is detected, there is either no trailer 266 present or the kingpin 16 was received vertically above the throat and improper coupling has occurred (FIG. 17, see vertical distance V). However, if the switch 538 and the bolster plate 264 are triggered, then proper coupling has occurred (FIG. 16). The type of inertial switch 538 can vary, and a conventional example of inertial switch is available from Adafruit (PN 1767). In one example, the inertial switch 538 is a momentary switch that closes when a certain acceleration is achieved. The amount of acceleration needed to close the switch is determined by the internal spring stiffness. Different switches are available, however the concept is the same. That is, the switch will allow a momentary current to trigger a microcontroller input.

Figure 14:
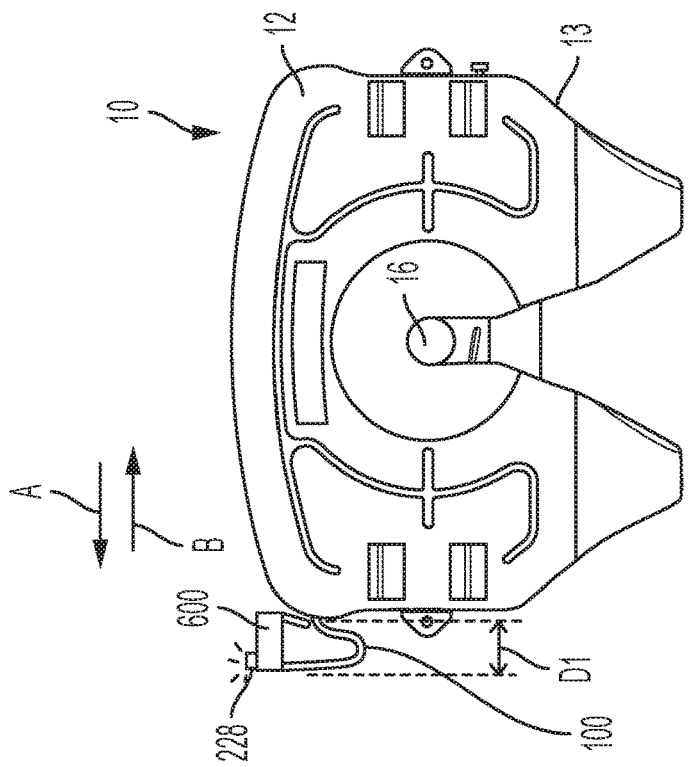
FIG. 14 is a top view of the example fifth wheel of FIG. 13 in the locked position with the handle in the fully retracted position.
Figure 13:
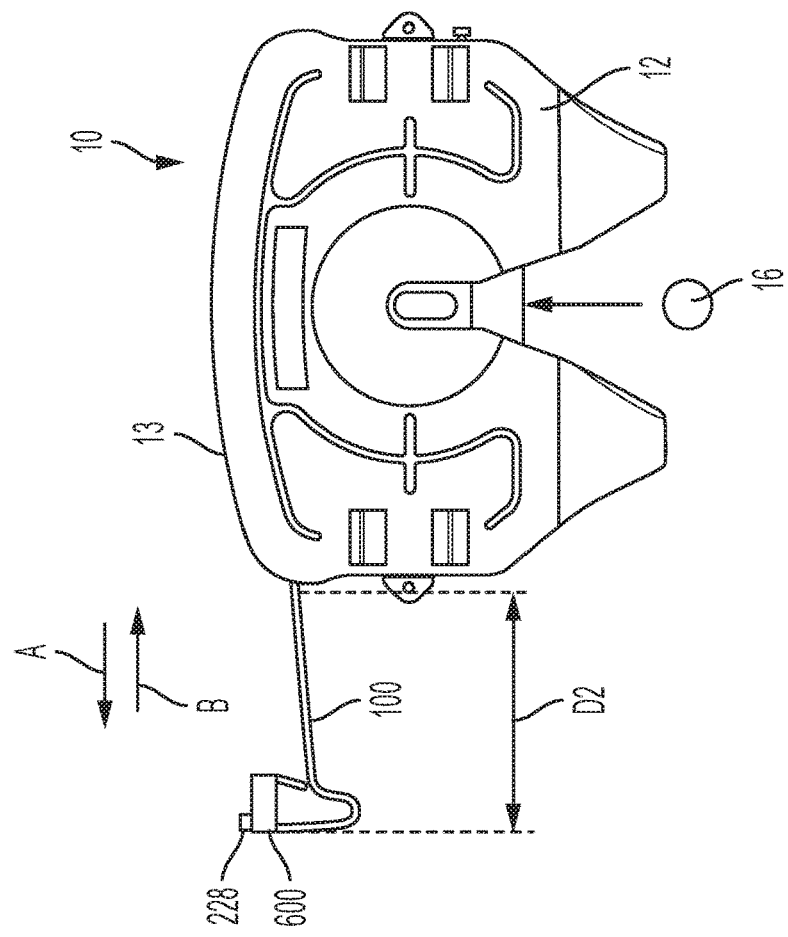
FIG. 13 is a top view of an example fifth wheel in the unlocked position with the handle in a fully extended position.

Referring to FIGS. 13-14, a housing 600 is coupled to the handle 100 and is configured to contain the components of the system 220. The housing 600 is coupled to the handle 100 by any suitable connector, such as adhesives, zip-ties, or brackets.

Figure 15:
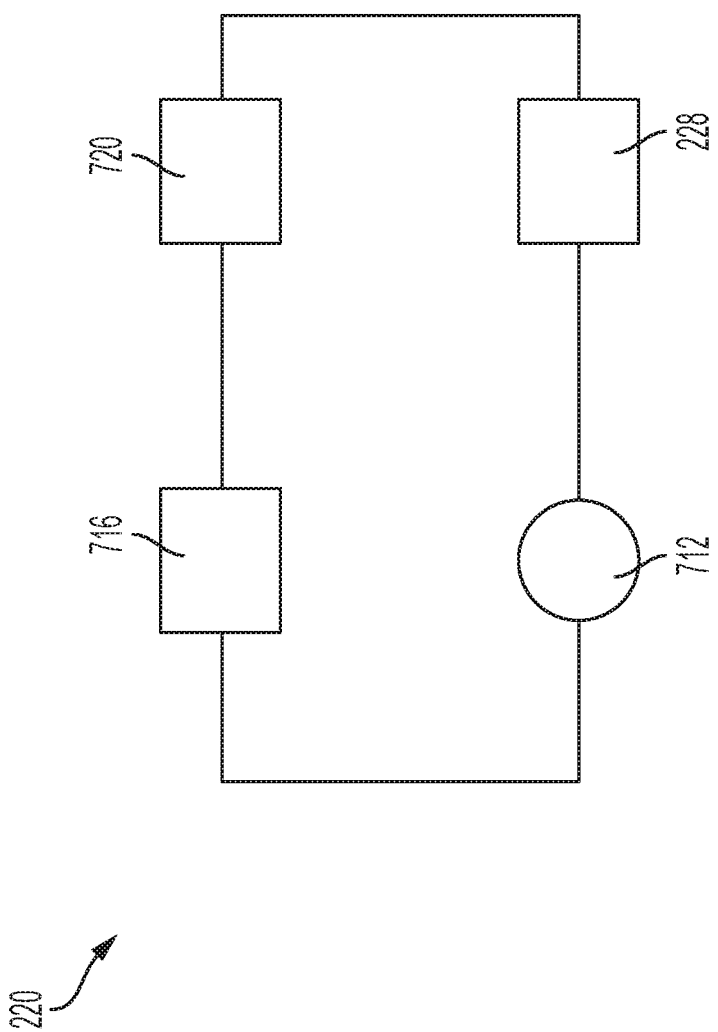
FIG. 15 is an electrical schematic of an example indicator system of the present disclosure.

Referring to FIG. 15, the present inventors have contemplated that certain examples of the system 220 do not require a controller. In these examples, simple electrical devices can be utilized. FIG. 15 is an electrical schematic for an example system 220 without a controller. The system 220 includes a battery 712 that provides power to the system 220, the indicator 228 that indicates proper coupling between the fifth wheel 10 and the kingpin 16 (FIG. 4) when the circuit is closed, and a switch 716 (e.g. inertial switch) configured to close when a predetermined force in the first direction or the second direction (see FIG. 1) is applied to the handle 100. In operation, the indicator 228 will only indicate to the operator when the predetermined force in the first direction or the second direction occurs and causes the switch 716 to close. Any other force will not cause the switch 716 to close. A timer 720, such as Texas Instrument's single timer LM555 or dual timer LM556, is also included and triggers on the closure of the switch 716. Accordingly, the indicator 228 would indicate (e.g. blink) at a predetermined frequency and for a predetermined duration. The indicator 228 may be controlled with a resistors and/or capacitors (not shown). In this example, the timers 720 are not programmable but rely on the resistors and/or capacitors to dictate the frequency and duration. As such, the switch 216 is a momentary switch. In certain examples, the battery 712 can be replaceable and/or rechargeable. The indicator 228 can be a speaker, a LED, or any other suitable device that is capable of indicating to the operator.

In certain examples, a method for monitoring coupling of a fifth wheel to a kingpin of a towed trailer includes sensing vibrations generated when the kingpin couples to the fifth wheel, generating vibration data based on the vibrations, and processing the vibration data to detect a presence or an absence of a predetermined vibration component that corresponds to proper coupling of the fifth wheel to the kingpin. The method can further include the steps of indicating proper coupling of the fifth wheel to the kingpin when the predetermined vibration component is present and indicating improper coupling of the fifth wheel to the kingpin when the predetermined vibration component is absent.

In certain examples, the processing of the vibration data includes identifying one or more vibration components and thereby comparing the vibration components to the predetermined vibration component. The processing of the vibration data can include performing a spectral analysis. In certain examples, the predetermined vibration component is a predetermined spectral signature that includes at least one amplitude threshold at a predetermined frequency range. The processing of the vibration data can further include identifying a time section of the vibration data such that the spectral analysis is performed on the time section. The time section can be triggered by movement of a movable component of the fifth wheel, which may be a handle.

In certain examples, the processing of the vibration data includes identifying vibration amplitudes in the vibration data and the time section is triggered when at least one of the vibration amplitudes exceeds a threshold vibration amplitude. The time section is a predetermined about of the vibration data surrounding the vibration amplitude that triggered the time section. In certain examples, the processing of the vibration data includes identifying at least one dominant frequency component in the vibration data and the predetermined vibration component includes at least one predetermined dominant frequency. The least one dominant frequency component can include an amplitude that is more than a predetermined amount greater than amplitudes within a preselected frequency range.

In certain examples, a fifth wheel system includes a fifth wheel configured to couple to a kingpin of a towed trailer such that vibrations are generated when the fifth wheel couples to the kingpin. A sensor in operative association with the fifth wheel and configured to sense the vibrations and generates vibration data. A controller receives the vibration data and processes the vibration data to detect a presence or an absence of a predetermined vibration component that occurs when the fifth wheel properly couples to the kingpin. An indicator indicates proper coupling of the fifth wheel to the kingpin when the predetermined vibration component is present.

In certain examples, the indicator indicates improper coupling of the fifth wheel to the kingpin when the predetermined vibration component is absent. The sensor includes an accelerometer or a piezoelectric sensor. The controller may further process the vibration data to identify one or more vibration components and thereby compares the vibration components to the predetermined vibration component. In certain examples, the vibration signature data is processed by performing a spectral analysis and the predetermined vibration component is a predetermined spectral signature. The predetermined spectral signature may include at least one amplitude threshold at a predetermined frequency range.

In certain examples, the controller identifies a time section of the vibration data, and the spectral analysis is performed on the time section. The time section can be triggered by the movement of a movable component of the fifth wheel. The controller may identify vibration amplitudes in the vibration data and the time section is triggered when at least one of the vibration amplitudes exceeds a threshold vibration amplitude. The time section can be a predetermined amount of vibration data surrounding the vibration amplitude that triggered the time section.

In certain examples, the controller identifies at least one dominant frequency component in the vibration data, and the predetermined vibration component includes the at least one predetermined dominant frequency. The dominant frequency component can include an amplitude that is more than a predetermined amount greater than amplitudes within a preselected frequency range.

In the present description, certain terms have been used for brevity, clarity, and understanding. No unnecessary limitations are to be inferred therefrom beyond the requirement of the prior art because such terms are used for descriptive purposes only and are intended to be broadly construed. The different apparatuses, systems, and methods described herein may be used alone or in combination with other apparatuses, systems, and methods. Various equivalents, alternatives, and modifications are possible within the scope of the appended claims.

What is claimed is:

1. A method for monitoring coupling of a fifth wheel to a kingpin of a towed trailer, the method comprising:
    sensing vibrations generated when the fifth wheel couples to the kingpin;
    generating vibration data based on the vibrations;
    processing the vibration data to detect a presence or an absence of a predetermined vibration component that corresponds to proper coupling of the fifth wheel to the kingpin; and
    indicating proper coupling of the fifth wheel to the kingpin when the predetermined vibration component is present;
    wherein the processing of the vibration data includes performing a spectral analysis; and
    wherein the processing of the vibration data further includes identifying a time section of the vibration data, and wherein the spectral analysis is performed on the time section.

2. The method of claim 1, further comprising indicating improper coupling of the fifth wheel to the kingpin when the predetermined vibration component is absent.

3. The method of claim 1, wherein the processing of the vibration data includes identifying one or more vibration components, and further comprising:
    comparing the vibration components to the predetermined vibration component.

4. The method of claim 1, wherein the predetermined vibration component is a predetermined spectral signature.

5. The method of claim 4, wherein the predetermined spectral signature includes at least one amplitude threshold at a predetermined frequency range.

6. The method of claim 1, wherein the time section is triggered by movement of a movable component of the fifth wheel.

7. The method of claim 6, wherein the movable component is a handle.

8. The method of claim 1, wherein the processing of the vibration data includes identifying vibration amplitudes in the vibration data, and wherein the time section is triggered when at least one of the vibration amplitudes exceeds a threshold vibration amplitude.

9. The method of claim 8, wherein the time section is a predetermined amount of the vibration data surrounding the vibration amplitude that triggered the time section.

10. A method for monitoring coupling of a fifth wheel to a kingpin of a towed trailer, the method comprising:
    sensing vibrations generated when the fifth wheel couples to the kingpin;
    generating vibration data based on the vibrations;
    processing the vibration data to detect a presence or an absence of a predetermined vibration component that corresponds to proper coupling of the fifth wheel to the kingpin; and
    indicating proper coupling of the fifth wheel to the kingpin when the predetermined vibration component is present;
    wherein the processing of the vibration data includes identifying at least one dominant frequency component in the vibration data, and wherein the predetermined vibration component includes at least one predetermined dominant frequency; and wherein the at least one dominant frequency component has an amplitude that is more than a predetermined amount greater than amplitudes within a preselected frequency range.

11. A fifth wheel system comprising:
a fifth wheel configured to couple to a kingpin of a towed trailer, wherein vibrations are generated when the fifth wheel couples to the kingpin;
a sensor in operative association with the fifth wheel and configured to sense the vibrations and generate vibration data;
a controller configured to receive the vibration data and process the vibration data to detect a presence or an absence of a predetermined vibration component that occurs when the fifth wheel properly couples to the kingpin; and
an indicator configured to indicate proper coupling of the fifth wheel to the kingpin when the predetermined vibration component is present; and
wherein the vibration data is processed by performing a spectral analysis; and
wherein the controller identifies a time section of the vibration data, and wherein the spectral analysis is performed on the time section.

12. The system of claim 11, wherein the indicator indicates improper coupling of the fifth wheel to the kingpin when the predetermined vibration component is absent.

13. The system of claim 11, wherein the sensor includes an accelerometer or a piezoelectric sensor.

14. The system of claim 11, wherein the controller processes the vibration data to identify one or more vibration components and thereby compares the vibration components to the predetermined vibration component.

15. The system of claim 11, wherein the predetermined vibration component is a predetermined spectral signature.

16. The system of claim 15, wherein the predetermined spectral signature includes at least one amplitude threshold at a predetermined frequency range.

17. The system of claim 11, wherein the time section is triggered by a movement of a movable component of the fifth wheel.

18. The system of claim 11, wherein the controller identifies vibration amplitudes in the vibration data, and wherein the time section is triggered when at least one of the vibration amplitudes exceeds a threshold vibration amplitude.

19. The system of claim 18, wherein the time section is a predetermined amount of vibration data surrounding the vibration amplitude that triggered the time section.

20. The system of claim 11, wherein the controller identifies at least one dominant frequency component in the vibration data, and wherein the predetermined vibration component includes at least one predetermined dominant frequency.

21. A fifth wheel system comprising:
a fifth wheel configured to couple to a kingpin of a towed trailer, wherein vibrations are generated when the fifth wheel couples to the kingpin;
a sensor in operative association with the fifth wheel and configured to sense the vibrations and generate vibration data;
a controller configured to receive the vibration data and process the vibration data to detect a presence or an absence of a predetermined vibration component that occurs when the fifth wheel properly couples to the kingpin; and
an indicator configured to indicate proper coupling of the fifth wheel to the kingpin when the predetermined vibration component is present;
wherein the controller identifies at least one dominant frequency component in the vibration data, and wherein the predetermined vibration component includes at least one predetermined dominant frequency; and
wherein the dominant frequency component has an amplitude that is more than a predetermined amount greater than amplitudes within a preselected frequency range.

* * * * *